US010115269B2

(12) United States Patent
Berman

(10) Patent No.: US 10,115,269 B2

(45) Date of Patent: Oct. 30, 2018

(54) METHOD AND SYSTEM OF WAGERING

(71) Applicant: Lyle Berman, Las Vegas, NV (US)

(72) Inventor: Lyle Berman, Las Vegas, NV (US)

( * ) Notice: Subject to any disclaimer, the term of this patent is extended or adjusted under 35 U.S.C. 154(b) by 0 days.

(21) Appl. No.: 14/719,013

(22) Filed: May 21, 2015

(65) Prior Publication Data

US 2016/0117887 A1 Apr. 28, 2016

Related U.S. Application Data

(63) Continuation-in-part of application No. 14/525,220, filed on Oct. 28, 2014.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2018.01) |
| ***G07F 17/32*** | (2006.01) |

(52) U.S. Cl.

CPC ........ *G07F 17/3255* (2013.01); *G07F 17/326* (2013.01); *G07F 17/3223* (2013.01); *G07F 17/3244* (2013.01); *G07F 17/3258* (2013.01); *G07F 17/3267* (2013.01); *G07F 17/3269* (2013.01)

(58) Field of Classification Search

USPC ........... 463/1, 15, 16, 20, 22, 25, 39, 40, 42

See application file for complete search history.

(56) References Cited

U.S. PATENT DOCUMENTS

| | | | | |
|---|---|---|---|---|
| 7,300,351 | B2 * | 11/2007 | Thomas | 463/20 |
| 7,677,968 | B2 * | 3/2010 | Schultz | G07F 17/34 273/138.1 |
| 9,053,605 | B2 * | 6/2015 | Barclay et al. | 463/20 |
| 2002/0183105 | A1 * | 12/2002 | Cannon et al. | 463/16 |
| 2005/0064933 | A1 * | 3/2005 | Davis | G07F 17/32 463/20 |
| 2007/0293293 | A1 * | 12/2007 | Baerlocher et al. | 463/16 |
| 2012/0071226 | A1 * | 3/2012 | Pacey et al. | 463/20 |

* cited by examiner

*Primary Examiner* — Adetokunbo O Torimiro

(74) *Attorney, Agent, or Firm* — Cantor Law PLLC; Michael A. Cantor

(57) ABSTRACT

The present invention provides a device and method of wagering on a game of chance. The game of chance is divided into a set of individual game rounds, each game round played in accordance with the nature of the type of game of chance that it mimics, but without providing a payable award. A paytable different than that generally accorded the type of game associated with the game round is provided. The paytable provides one or more point for a favorable outcome. The points are accumulated during play of the game rounds. At the conclusion of the last play of a game round, accumulated points are compared to one or more point ranges provided by the paytable. The point ranges are associated with an award. When the player has accumulated sufficient points such that they are within one of the point ranges, the player is paid the award associated with that range of points.

14 Claims, 14 Drawing Sheets

METHOD AND SYSTEM OF WAGERING

RELATED APPLICATION DATA

This application claims priority to U.S. application Ser. No. 14/525,220, filed on Oct. 28, 2014, which is incorporated herein by reference.

FIELD OF THE INVENTION

The present invention relates generally to systems and methods for gaming, and more particularly to systems and methods for wagering on a series of game outcomes associated with the play of a particular game.

BACKGROUND

Wagered gaming has been around for centuries. It is a pastime that provides a form of entertainment and excitement enjoyed by many people. The primary location where gaming takes place is at a casino. These are establishments specifically licensed by a local law enforcement agencies to allow such gaming within an established legal framework. Casinos offer many forms of gaming to the player. There could be, for instance, sports betting, where a player makes a wager on the outcome of a sporting event. The casino could also offer live poker where players sit around a large table and play various poker games, such as Texas Hold'em, Seven Card Stud or Omaha, against other players. Common to many casinos are table games such as Blackjack, Roulette, Baccarats, Pai Gow and Craps, among others, which are played at a table but against the casino or house and not against other players. Games played against the house are referred to as "banked" games since winnings are received from the casino's "bank" and losses are paid to the casino's bank. Thus, the casino has a stake in the game. All banked games are designed so that the return to player (RTP) percentage, also called the payout percentage, is less than one hundred percent (100%). This is the calculated percentage returned to the player over a theoretically infinite number of outcomes in relation to the wager. The fact that it is less than 100% helps to ensure that the casino will generate revenues over the course of time. Thus, it is possible for the casino to lose to players on occasion, but over a significant period of time, the casino should almost always come out ahead. The game math is designed this way with the RTP percentage range generally controlled by the regulatory framework of the respective jurisdiction in which it resides.

Non-banked games, such as live poker, are, as mentioned, played against other players. A player's win or loss thus comes from or goes to the other players at the table and not the casino. The casino derives revenues from such games by establishing a "rake", which is generally a percentage of the amount wagered or some pre-established set amount.

With the advent of mechanical and (later) video slot machines, slot games became prevalent and are now one of the most common forms of gaming typically seen in the casinos. The video slot machine, also known as the video gaming machine or electronic gaming machine, among other names, not only provides the player with slot games, but can also include games such as Blackjack and Roulette. The video slot machine is essentially a computer having input and output means and a video monitor. So, any game that is capable of being implemented in the machine through software, displayed on a monitor, controlled, as necessary, through input and output, and approved by local regulatory agencies, can be offered to the player through these devices. However, it is the slot game that is most dominantly seen with these devices.

Since it is the goal of the casinos, as it is with any business, to generate revenues, it pays to have games that can be played in a continuous manner with as little time as possible between game outcomes. The quicker the play of the game, the more times it can be played within a given period of time. This provides for more wagers per unit time and thus ultimately more revenue. Many of the games noted above are designed for this type of continuous, high cycle play. For instance, each slot game outcome or video poker game outcome can take as little as a few seconds between successive outcomes. Wagers can be automatically placed and the game can even be made to commence automatically after the conclusion of the previously played game in a repetitive cycling in order to increase the speed of play. Although this type of continuous, high speed play appeals to the casinos due to the potential for higher revenue generation, it does have disadvantages that detract from the playing experience for many players and potential players.

Most players who play games such as slots, blackjack and video poker in a continuous, repetitive manner, generally play without breaks between game outcomes. Given the house advantage (i.e. a return to the player of less than 100%), a player with a limited budget can thus exhaust funds allocated for wagering in an unanticipated, or at least undesired, small period of time. Of course the player could attempt to slow down their play or reduce the amount wagered, but these are only mitigating means that allow for an expansion of playing time. And most players do not want to sit idle between plays; at least not for the purpose of slowing down game play. They want to play continuously, but may nonetheless be fearful that their funds will run dry within a short period of time. Many players will avoid the casinos and the play of these games for this reason. Thus, there would be an advantage in a means that attracts and maintains players that are otherwise hesitant or simply will not come to the casinos because of the potential for a quick loss of funds. The cost/benefit analysis or cost/entertainment analysis is simply not met by some thereby causing them to forego wagered gaming as a form of entertainment. But if a means could be implemented to alter the equation, more players would be incentivized to play. This is true not only for those hesitant to come to the casinos, but also for those that may play online through the Internet using their computers and mobile devices.

In fact, the disadvantage is, perhaps, amplified for those that play over the Internet through online virtual casinos. This is because the Internet reaches a broader group of people. Many that might otherwise play may not do so due to the same potential for quick loss of funds. The percentage of potential players with that attitude would arguably be larger for those with access to the Internet in a legal gaming jurisdiction than for those that take a proactive step to visit a bricks and mortar casino due to the larger population segment and also because those players are less likely on average to be risk takers since, on average, they are less likely visit the land-based, bricks and mortar casinos.

A further disadvantage, associated with those noted above, is that the wagering scheme is all too consistent. Therefore: (i) a wager is made on the outcome of an event; (ii) a random event is generated; (iii) a win/loss result is determined in relation to the wager; and (iv) the player optionally repeats (i) through (iii). As noted, this repetitive, cyclic process occurs for most games played at a casino—regardless of whether it is a real bricks and mortar casino or virtual casinos. It would be an advantage if a new and different type of wagering scheme were developed for players that would provide a different kind of gaming experience whereby continuous wagering is not required albeit continuous outcomes are perceived and awarded.

U.S. Pat. No. 8,360,857 by Walker discloses flat rate game play sessions whereby a contract is formed with the player such that for a consideration in the form of a money, a given duration of play, a given number of plays, and/or play for a number of qualifying events is provided to the player. One price is paid for a number of plays. However, although this modifies the wagering scheme to some degree, each game play is provided an individual wager and the winnings to the player are determined based on each individual outcome in the same cyclic manner as that described above.

Thus, there would be an advantage in a wagering scheme that is both different from that typically used in wagered-based gaming games and that allows that player to receive a gaming experience for a relatively lengthy period of time without the high risk of quickly losing their available wagering funds.

SUMMARY

The present invention relates generally to systems and methods for gaming, and more particularly to systems and methods for consolidating a series of game outcomes associated with the play of a particular game during a wager-based gaming session into a singular game outcome.

One aspect of the invention includes a device or system capable of receiving funds or credit for use by a player to wager on a game of chance, a game of chance playable by a player, and an associated paytable. The game of chance can be any game that provides a specific, final outcome. At least one particular minimum outcome having a given probability of occurrence is defined for the game. This minimum outcome and all additionally defined outcomes having a probability less than that of the particular outcome are deemed positive outcomes resulting in the generation of a point. A plurality of games are played as game rounds of a complete game, whereby each game round meeting or exceeding the particular outcome generates a point. A game round counter indicates the number of game rounds remaining or played and a point counter indicates the number of points accumulated. A game paytable having one or more accumulated point ranges define the number of accumulated points that must be achieved in order to receive an award. Each point range is associated with a specific award. Points are accumulated over the course of a game through the play of a defined set of game rounds. In the event an award is achieved through the successful accumulation of points at the conclusion of the defined set of game rounds, the device or system includes the capacity to provide a return in the form of an award or winnings to the player based on the player's wager and the player receives such award.

Various implementations of the invention can include multiple selectable paytables providing various numbers of game rounds and various point ranges. Additional variations can include variations on the span of the point ranges. The device or system includes an input device for selecting the desired paytable. Additionally, the particular minimum outcome may be selectable by the player or by the device or system, which may have effect on other selectable variables in order to maintain a desired return to the player. The percentage return to player can therefore be adjusted through changes to either or both the point ranges and the particular minimum outcome selected for the game, as well as other variables such as cost to play, award values and variations in the points generated (or deducted) for various outcomes.

Thus, other implementations can include more than one particular minimum outcome. While one minimum outcome can provide the accumulation of one point, another defined minimum outcome, generally having a lesser probability of occurrence, can provide the accumulation of two points or some other number of points. Additionally, certain defined outcomes can cause a subtraction of one or more points. Bonus game or other features, including the addition of extra game rounds, can be triggered to further provide opportunities for point accumulation or subtraction.

In another aspect of the invention, multiple games may be concurrently played. Each of the games can be associated with a different paytable thereby having a different particular minimum outcome or minimum outcomes, a different number of game rounds, and/or a different number of associated point ranges or range spans. The progress of each game is displayed in a separate game round counter and points counter, but each of the games is dependent on the outcome of the same game round. The games may initiate at the same time by the player making a wager concurrently on each and all of the games, or the game may be initiated after the initiation of one or more other games by the making of a wager on the new game while in the middle of playing the one or more other games. One game may conclude while one or more other games continue through the consecutive play of game rounds.

In yet another aspect of the invention, a method is provided to allow a player to conduct a series of steps to play a computer implemented game of chance having a wagering structure based on a series of outcomes. A number of game rounds is selected for a game set, the game rounds generally similar to that of a typical game played at a casino establishment or on an online Internet-based casino. A wager is made on the game with credited funds. The player initiates play of a game round. The computer implemented game determines if a minimum outcome has been met. If it has, a point is awarded to the player. The computer implemented game then determines if the last game round from the game set has been played. If not, the player initiates the play of another game round. A similar determination is made to determine if the minimum outcome has been met and if the last game round has been played. When the last game round has been played, the computer reads the number of points accumulated throughout the set of game rounds and compares the accumulated point total to at least one range of points. The at least one range of points is associated with an award. If the accumulated points total is within the at least one range of points, the computer implemented invention provides the player with the associated award.

The present invention also encompasses a system for providing a sweepstakes to a player or person, and methods for providing such to a person or player. The sweepstakes uses an alternative game, game rounds from which are provided to the person or player upon visits to a designated location or in when conducting transactions through a designated provider. After a designated number of visits or transactions are made, and a set number of game rounds are played, the alternative game concludes and the person or player is provided an award if a points accumulation resulting from the alternative game has exceeded one or more pre-designated scores.

The systems and methods of providing the sweepstakes are also offered in conjunction with events that have the capability of providing two different outcomes from the same result. Therefore, where a player receives an outcome from the results of the event that are primary, a secondary outcome from the same result can be used in conjunction with an alternative game. The use of the secondary outcome in association with an alternative game provides incentive to partake in the event in as associated with the primary outcome.

These and other features, aspects, and advantages of the present invention will become better understood with reference to the following description and claims.

DETAILED DESCRIPTION

Figure 1:
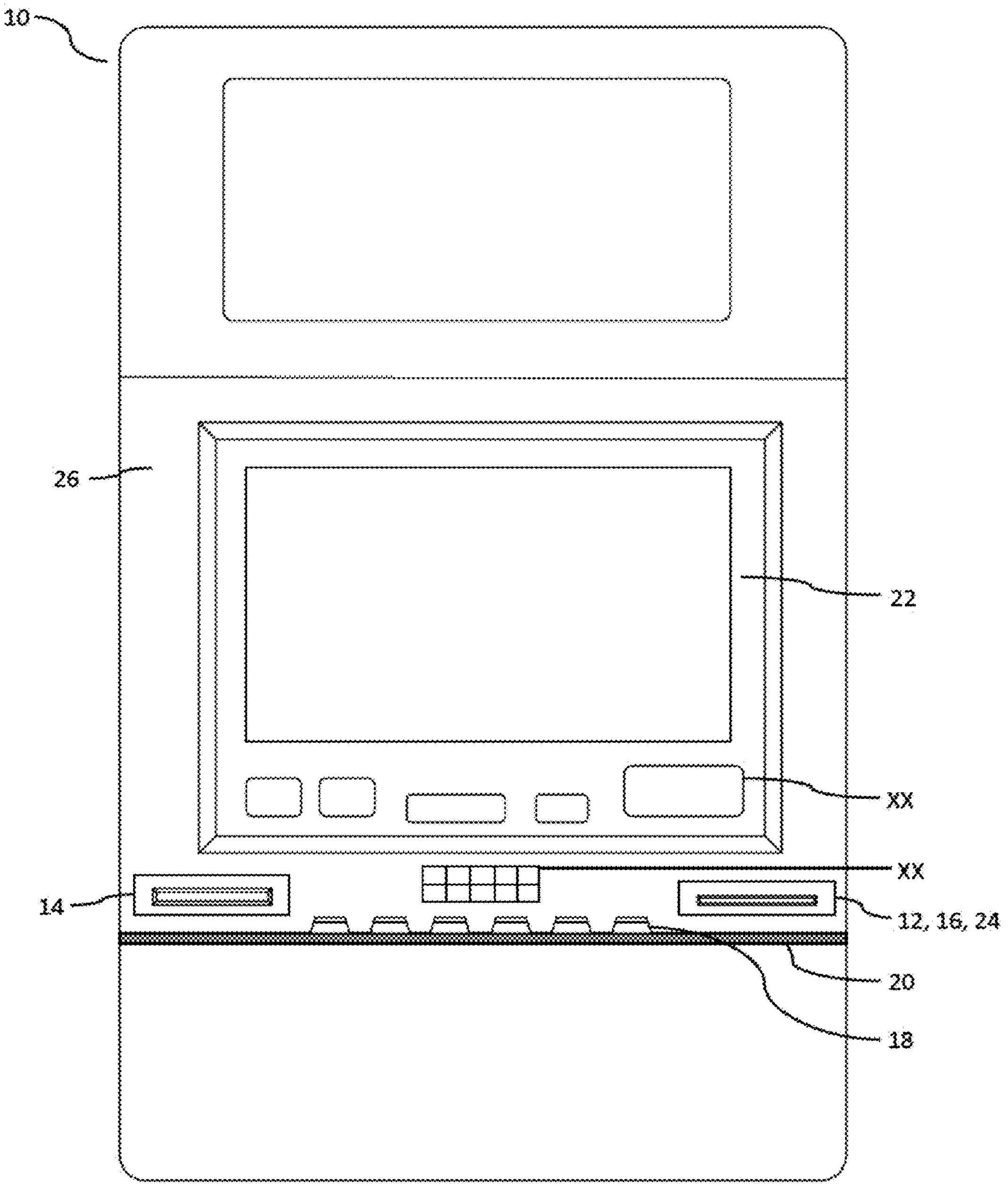
FIG. 1 displays a representative electronic device for implementation of the present invention.

The present invention is a method and system directed towards wagering in conjunction with games of chance including, but not limited to, slot games, blackjack, keno, draw and stud poker, craps, and roulette. In a preferred embodiment, the game of chance is one that by its nature is generally played in a cyclic manner, with the time between successive outcomes, if played repetitively without self-imposed breaks, being relatively slight. The games noted above are such games.

The method and system can be deployed in any wager-based gaming market that makes use of such games. This includes the casino markets (both class II and class III, as those terms are understood in the United States, and similar non-U.S. casino markets), video lottery markets that use video lottery terminals (VLTs), sweepstakes and charitable gaming markets, and even the social gaming market, which is not a wager-based gaming market but does provide for the wager of virtual funds (i.e. non-tradable currency) within a virtual casino.

Slot games, for instance, can be played in as little as a few seconds between "spins". The symbols are randomly re-arranged and combinations of symbols instantly assessed against a paytable of wining combinations. A handle can be pulled, a button pressed, a touch-screen interface touched, or through settings that allow for automatic re-play, the symbols are again re-arranged and the cycle continues, depending on the implementation of the game within the gaming device or system.

Video poker is another game that can be quickly played between outcomes. There are many variation of video poker, but perhaps the most popular is five-card draw. In that game, five cards are dealt. The player selects none, one or more cards to hold and discards the remainder. New cards are dealt to replace those discarded. The resulting hand is compared against a paytable of winning outcomes. The initiation of the games and the selections can also be done through the press of a button or the touch of a touch screen to enable rapid play of hands.

Although some embodiments are best suited for the repetitive, fast-playing games noted, the present invention is suitable for most any game of chance that provides a final outcome and is not limited to only these types of games.

The common casino game of Blackjack is another such game. The player plays against the dealer for the better hand. The player is dealt two cards and then serially selects if she would like to receive another card; the goal being to achieve a hand closest to a cumulative total of 21 without going over that total; else the hand then becomes a losing hand, considering that the dealer, too, will attempt to obtain a hand closest to a cumulative total of 21. Other features and variation exist, but suffice it to say, upon conclusion of the game, another may be instantly dealt in a quick, repetitive manner.

The present invention is implemented using a device developed specifically for gaming, such as the electronic or electro-mechanical gaming machines found throughout casinos, or through a device not specifically developed for gaming but having sufficient capabilities and functionalities to carry out or support all necessary functions to enable wagered-gaming on the device. The invention may be implemented for those devices specifically developed as gaming devices in a standalone mode where the coded instructions for carrying out many of the game operations are resident on the device. However, the gaming device may also be connected to a computer network where some or all of the coded instructions are resident on a secondary device, such as a server, and downloaded or streamed to the gaming device. Devices not specifically developed for gaming are linked to a computer network, such as the Internet, as these devices, which are generally not located within a casino or other licensed location, must be provided opportunities for wager-based gaming from a remote, licensed source. Therefore, communications must be established from such source to the device, which can be both generally immobile (e.g. a personal computer) and mobile (e.g. a smart phone or tablet device). Additionally, communication with a financial source is necessary as the player cannot fund the device locally with hard currency or coin and must electronically transfer funds to an account established between the player and the game provider (i.e. an Internet Casino) for making wagers. Notwithstanding the above, the present invention can also be implemented through live play at a physical gaming table.

Referring to FIG. 1, a representative electronic device for implementation of the present invention is shown. FIG. 1 is an electronic gaming machine (EGM) 10 or video gaming machine. The electronic gaming machine is also generically referred to as a slot machine or video slot machine, but this is a misnomer since many types of games; not just slot games, may be implemented in these types of devices. There are electronic gaming machines that allow players to play blackjack, roulette, baccarat, keno, poker and many other games. Certain components of the electronic gaming machine 10, and any other electronic device capable of implementing the invention, are inherent in most any computing device; for instance a memory storage medium, a processor, input and output devices, bus circuitry, and a display, among other components. In addition to such components, the EGM 10 and other electronic devices capable of implementing the invention include components and capabilities for securely receiving funds, making a wager, delivering funds or credit back to the player or the player's account, and playing the particular game.

The input devices of the EGM 10 enable the performance of many functions associated with the present invention including, among other things, providing funds to the EGM to allow for the making of a wager, making a wager, the selection of game variables associated with play of the game, initiation of play, and withdrawal of funds or credit from the EGM 10. The bill validator 12 provides a means to credit the EGM 10 through the input of paper currency thereby providing funds to make a wager. A coin acceptor (not shown) similarly provides a means to credit the EGM 10 through the input of nickels, dimes, quarters or any other coin accepted by the coin acceptor. Other input devices for delivering funds to the EGM 10 include a card acceptor 14, for reading credit cards, debit cards and the like, and commonly a voucher acceptor 16, for reading vouchers, also referred to as tickets, associated with a specific sum of money. The former of these devices; i.e. the card reader, is typically linked to an external system to enable the transfer of funds and credit from external sources, such as a bank. The voucher acceptor 16 is linked and in communication with an internally dedicated, secure voucher system. Once funds are received through any of the other input devices for the delivery of funds, a secure currency-bearing voucher is created and distributed to the player. The internal system allows for transfer to and from other devices linked to the same voucher system thereby allowing the voucher, once issued, to be continuously used with other devices. The voucher is securely coded to provide for identification of the funds associated therewith. The code is read by the device and the amount stored in system memory is then credited to the device receiving the voucher. The voucher can therefore be used same as currency to fund the EGM 10. A new voucher is withdrawn from the EGM 10 with a new associated code and value at the completion of play, with a new entry stored in system memory associating the new code with the given value. Any funds remaining on the voucher can be used at another device or redeemed at a specialized kiosk (not shown) or other device linked to the voucher system (so that it can identify and authenticate the voucher) and capable of distributing funds. It can also be brought to a cashier who can identify and authenticate the funds associated with the voucher using a separate device in communication with the voucher system and pay the player the amount associated therewith in exchange for the voucher.

Still referring to FIG. 1, additional input devices are used to actually make the wager and to make various selections associated with the game being played. These selections can include, among other things, a number of paylines in a slot game, the denomination of the wager made and the number of credits of that denomination to wager. Many other peripheral features can also be input using the input devices such as the volume emanating from the speakers of the EGM 10, the speed of play, and, in some EGMs, an auto-play selection. For other games, information associated with its particular type of play are entered. For instance, in regards to a video roulette game, the selection of numbers or color. In a draw poker game, the cards to hold or the cards to discard. In Blackjack, whether to be dealt another card or to stick with the currently dealt hand.

Play of the game is initiated using some of these same input devices. Such input devices commonly include buttons 18 on a button panel 20, or a capacitive surface interface associated with the display screen 22. The capacitive surface interface receives input through player touch of the display screen 22, and is thus typically referred to as a touch screen, which then localizes the change in capacitance, maps the location, and processes a given input based on the defined location (e.g. denomination, number of paylines, number of credits bet per payline, selected number(s), card(s) to hold, etc.).

The EGM 10 also includes various output devices. These are most commonly used to distribute funds back to the player and to display the game. Distribution of funds is generally provided using a voucher dispenser 24, which generally has dual functionality as the voucher acceptor 16 and bill acceptor 12. The player initiates a "cash-out" action through a selectable option using one of the input devices and the voucher is dispensed having a value associated with the credit amount then-existing at the EGM 10. Some EGMs distribute funds through a coin dispenser (not shown).

In another embodiment of the invention, a computer network; namely the Internet, is provided. Personal computers and mobile devices, such as smart phones, tablet devices and lap top computers send and receive communications from servers and middleware linked to the network. These personal computers and mobile devices include many of the same basic elements as the EGM. However, the secure gaming operations and financial transactions are conducted remotely through a secure server that communicates with the personal computer and mobile devices through the Internet.

Figure 2:
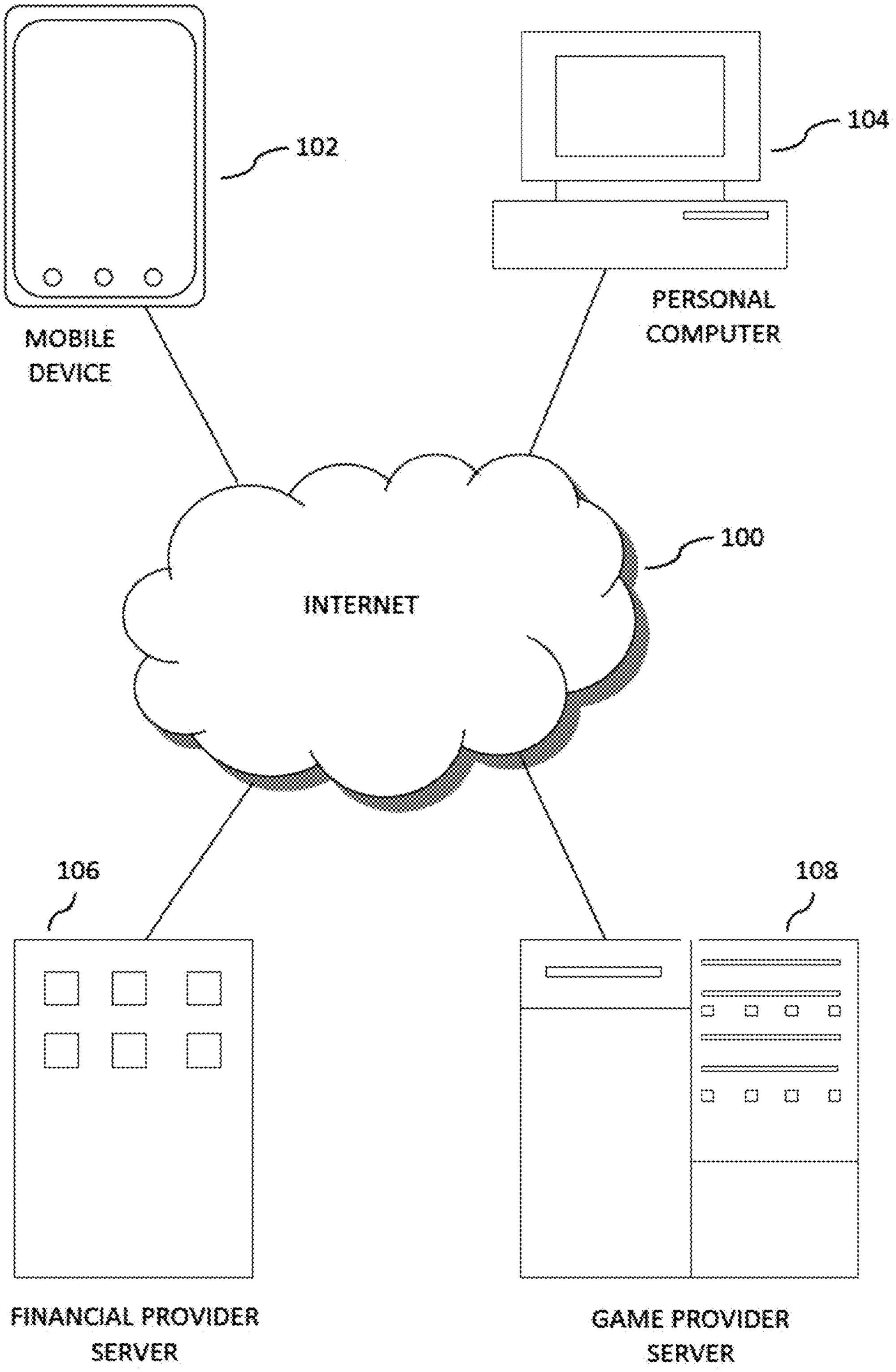
FIG. 2 displays an Internet-based gaming system.

FIG. 2 generally depicts an Internet-based gaming system. All devices are linked and in communication with the other through the Internet 100. Gaming is conducted on either or both a mobile device 102 and personal computer 104.

The input devices used with both a personal computer 104 and mobile device 102 include, but are not limited to a mouse, a keyboard, and a keypad, but may also include a capacitive surface interface similar to that used with the electronic gaming machine monitor. The personal computer 104 and mobile device 102 also include a display screen and at least one processor for computing electronic operations. The personal computer 104 and mobile device 102 access and conduct communications through the Internet 100 or other established wide area network to conduct wager-based. Electronic funds transfer is provided between the player located at the personal computer 104 or mobile device 102 and a financial provider server 106 to securely transfer funds to the game provider's server 108. Game operations are securely conducted between the game provider server 108 and the player to play the game and determine a win or loss. This must be conducted remotely and under a secure server environment as dictated and regulated by applicable gaming authorities.

More specifically, to conduct Internet or networked-based gaming, the personal computer 104 or mobile device 102 establishes communications with the server of an online game provider 108 by identifying the server by the server's unique uniform resource locator or URL through a web browser and transmitting a call. A web browser, an application stored in the user's personal computer, enables communications through the Internet 100 to other nodes within the network of nodes defining the Internet, including the game provider server 108. Mobile devices use native platforms that are different than browsers, such as iOS for use with Apple mobile devices and Android for use with a variety of other manufacturer's mobile devices, but the purpose and results are substantially similar. Communication links to and from the Internet 100 are established via wire, such as cable, digital subscriber line, or the like, or through wireless transmission such as satellite, Wi-Fi, or the like. Established communication protocols are used to control data download and data upload, and to ensure the nodes can read the data being sent from other nodes. Communications are thus established between the personal computer 104 or mobile device 102 and the online game provider's server. The online game provider server 108 houses a repository of virtual wager-based games of chance that a player may select for play. That information is communicated to the mobile device 102 or personal computer 104 and shown on its display. The game provider's server 108 also contains the software and content, stored in a memory device, which is processed through one or more processors and streamed or downloaded through the Internet 100 to the personal computer 104 or mobile device 102 to enable the display and play of the various games. The game provider server 108 maintains the electronic infrastructure to securely conduct financial transactions with a financial provider's server 106, track the amount of funds deposited to an account established for a given player, use the funds to finance the play of the games, track the deductions and credits to such account based on wagers made and game outcomes, and to process the coded instructions that allow for the play of the game and the determination of game outcomes. After an account is established with the online game provider, currency is deposited through means generally available for making online purchases.

Regardless of the device used to embody the invention; be it a slot machine, personal computer, or mobile device, or the means used for initiating a wager, the input and output devices, or the type of display, once the wager is made and play of the game is initiated, the game dynamics are displayed on the at least one display or monitor. Additional input may be required during the course of the game. If so, as indicated above, such input is provided, if a slot machine, through the button panel controls or through the touchscreen interface of the monitor. Similarly, if a personal computer, through the mouse, keyboard or touch screen and, if a mobile device, through a keypad or touch screen. All of the representative devices possess memory to store computer code and at least one processor to process the operations of the game and include all of the necessary input, output and display elements to securely carry out at least the same primary elements of the present invention. Thus, the functionality to securely process the receipt and delivery of funds, allow a player to make a wager, and to process and display the play of a game. Slot machines, personal computers, and mobile devices can securely perform such functions.

Figure 3:
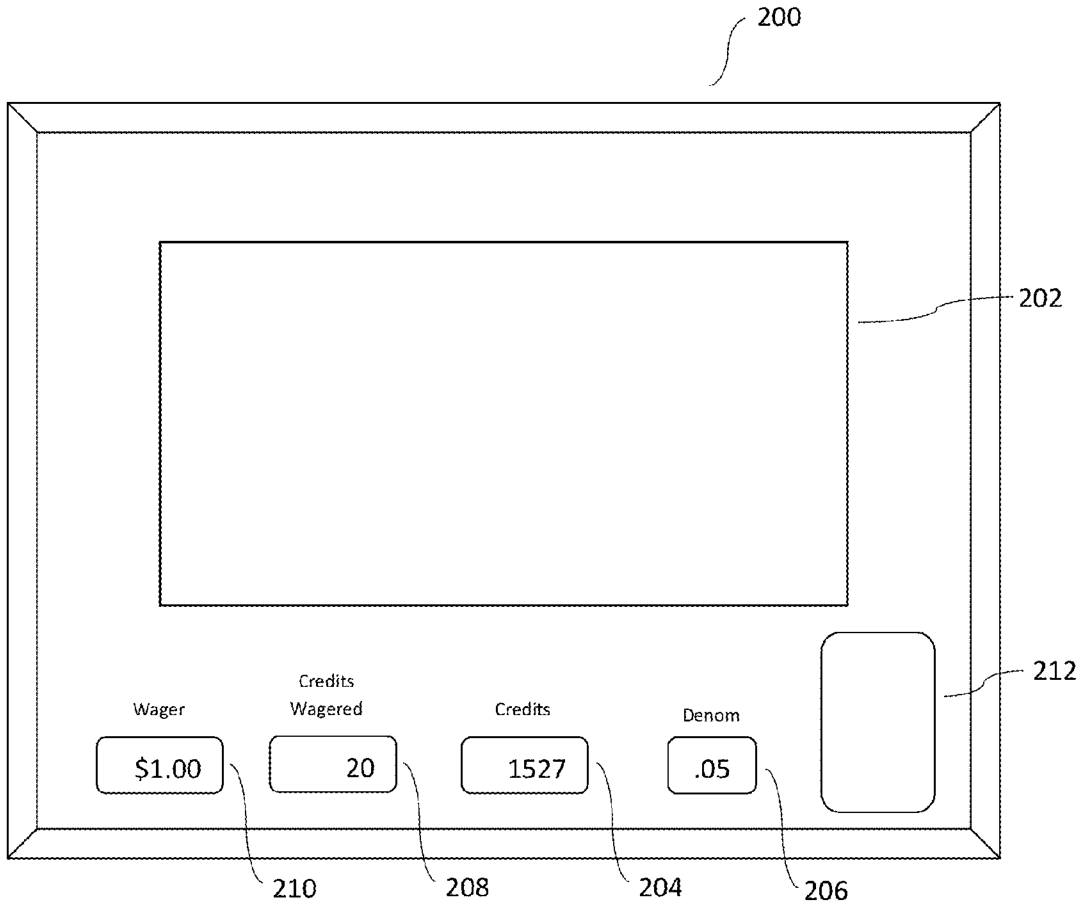
FIG. 3 depicts a display screen of a representative electronic device.

Referring to FIG. 3, each of the representative electronic devices capable of implementing the invention includes a display screen 200 similar to that shown in FIG. 3. One embodiment that does not require a display screen is that which uses a "live" table for implementation. Although the present invention can be used in association with live table gaming, it is not a preferred embodiment. For electronic devices, the display screen 100 displays the play of a game. In the case of an electronic gaming machine, the game may be dedicated to the machine or it may be selectable from a group of games stored in memory as computer code. In a server based gaming system, the electronic gaming machine is communicatively linked to a server that stores a library of games in associated memory; allowing a game selected from the library to be downloaded to the electronic gaming machine for play. Either the player or the location operator (e.g. the casino manager) selects the game for download which is then either streamed to the EGM from the server for real-time play at the EGM, or downloaded to non-volatile memory included or associated with the EGM for play at any time after such game is fully downloaded and resident in the EGM's memory.

The display includes a game display area 202 where the game is shown. There are other display windows, generally smaller in size, for displaying other information associated with the EGM or other electronic device and the particular game being played. So that a player can see the amount of wagerable credits available, a credit meter 204 is provided. The credit meter 204 displays the number of credits stored for a given denomination and available for wager. Another display window 206 shows the denomination of the wager. The denomination may be set by the game, EGM or system, or typically in more modern electronic gaming devices, may be selectable by the player from a plurality of selectable denominations; for instance, penny, nickel, dime and quarter. If ten dollars is provided to the electronic device, and 'quarter' is selected as the denomination, twenty five cents will be indicated in display window 206 indicating denomination and "40" will be displayed in the credit meter 204. The player can then wager up to 40 credits, which can be wagered one credit per game, up to 40 credits for one game (if that many credits can be wagered for that particular game), or anything in between. Another display window 208 indicates the number of credits wager on the current game. The number of credits to be wagered is selected by the player. Another display window 210 shows the actual wager; which is the denomination selected, as indicated in display window 206, multiplied by the number of selected credits indicated in display window 208.

For some games, another display window 212 shows a paytable 214 associated with the game. In video poker games, a paytable 214 is displayed in the display window 212. In a typical game of five-card draw poker, the paytable is a plurality of various final outcomes or final hands. Each of the different hands is associated with a certain award. There are numerous paytables used for a standard Jacks or better five-card draw video poker game, which requires at least a pair of Jacks to generate a payable outcome (any hand superior to a pair of Jacks also a payable outcome).

For slot games, the paytable is generally shown on a series of help screens (not shown). These are accessed through the applicable input and the game display 202 is then replaced with a display that shows the combinations of symbols that provide winning outcomes. Often, a plurality of screens provide such information and can be seen in sequence by providing further input to generate the next (or previous) display page. Notwithstanding the above, some still may show all or some of the winning outcomes in the paytable display window 212. Typically, the other display windows showing denomination 206, credits wagered 208, the number of credits remaining (i.e. the credit meter) 204, and the total wager made 210 remain.

In another example, for a game of Keno, after the number of spots are selected, which can generally run from three spots up to 10 spots, but can be any number of spots, the paytable 212 will display the credit wins for the number of matching spots. The number of spots and the spot numerals are selected using one or more input devices. The paytable 212 is therefore variable and will change in accordance with the number of spots selected. The display windows described in the examples for video poker and slots will remain essentially the same.

In a last example, the paytable for a Blackjack game is more likely to be displayed in the display window in conjunction with a video display of a Blackjack table. Therefore, in a manner similar to how the paytable is shown in a live table game. The paytable in a typical Blackjack game is concise with generally only a few possible outcomes, so it is simpler to display the paytable to the players in this manner. Thus, the video (and live table) display shows on the table that a dealt blackjack pays 3:2 and that the dealer must stand on 17 and draw on 16. Other payable features, such as insurance pays and five or more card pays could also be displayed.

All of the paytables described are representative of standard paytables of the prior art associated with their respective games. In the present invention, these paytables are either replaced or accompanied by a different type of paytable; i.e. a paytable that does not just vary the indicia that make up the winning outcomes, or the awards associated with the winning outcomes, but a different type of paytable that provides a different manner of wagering and play. These "alternative paytables" can replace the standard paytables or can be offered in addition to the standard paytables. These types of alternative paytables can be used similarly with any of the games, noted above, or any other game to establish an alternative game.

Figure 4:
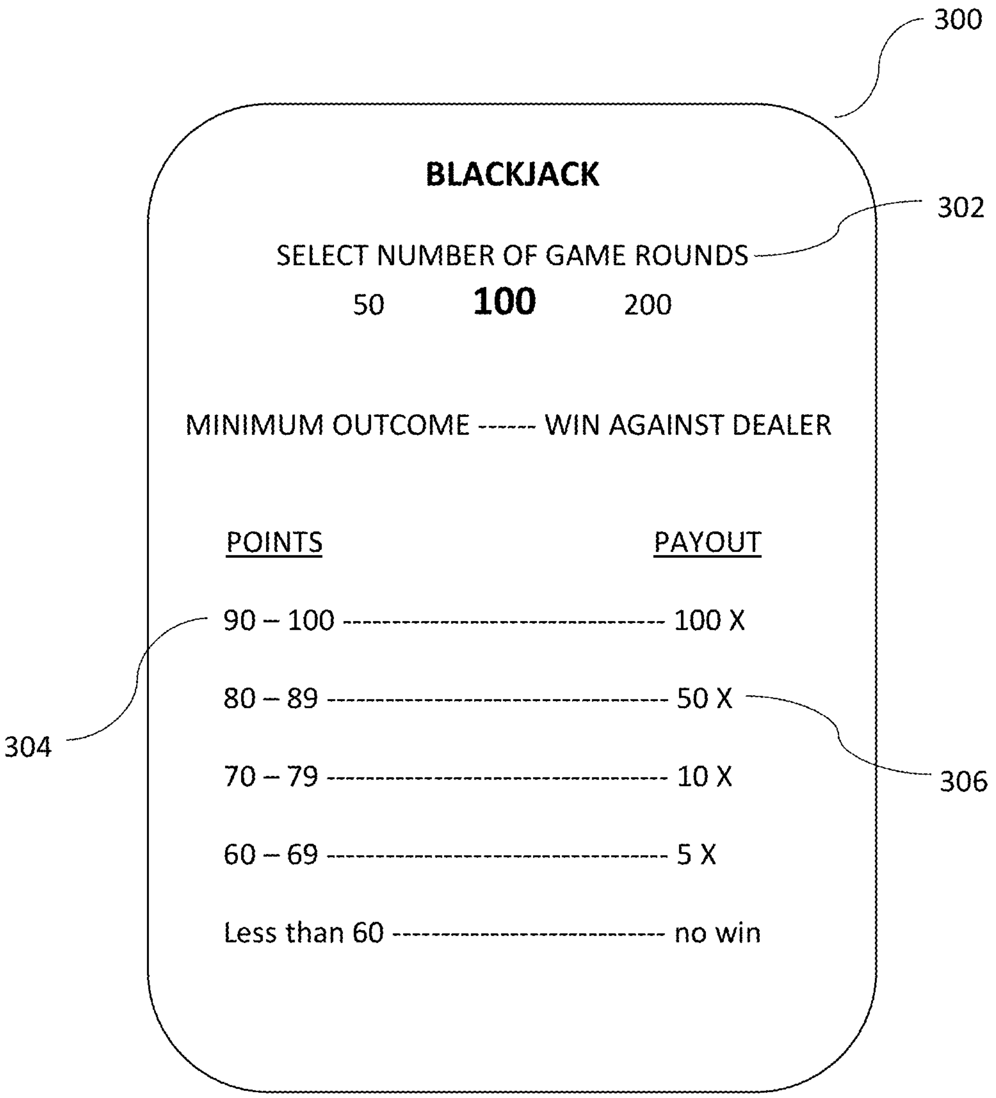
FIG. 4 is representative of an alternative paytable of the present invention for a first number of selected game rounds.

An example of an alternative paytable that can be used with the present invention is shown in FIG. 4. The alternative paytable 300 includes a selected number of game rounds 302 or, in an alternative embodiment, the paytable is fixed at a set number of game rounds without giving the player the ability to select a number of game rounds to play. In the example of FIG. 4, the player can select between 50, 100 and 200 game rounds.

A game round is a play of what would otherwise be a standard game, such as those noted above, or any other standard game, and is played generally the same as if the player were playing the game in typical fashion but as a series or set of rounds until the last round of the set of game rounds is completed. The alternative game is not completed until all of the game rounds have been played. Another difference is that the primary goal of the player in regards to the play of a game round is to achieve a certain minimum outcome in each such game round and not necessarily or primarily to achieve the highest or best outcome. If the minimum outcome is achieved, the player is awarded a point. Thus, an alternative game is a series or set of standard games that are played as game rounds for the purpose of attempting to accumulate as many points as possible prior to the completion of the set of game rounds by meeting or exceeding a prescribed minimum outcome for each game round. As will be discussed further, the purpose is also to achieve the accumulation of sufficient points by the completion of the game rounds so that the total points accumulated are within a point range with generates an award to the player.

Each of the game round selections has a series of point ranges 304. The point ranges 304 indicate winning outcomes for the paytable. In the example of FIG. 4, the point ranges for the game round selection of 100 are "less than 60", 60-69, 70-79, 80-89, and 90-100. The payouts 306 for each are, respectively, 0, 5×, 10×, 50×, and 100×, respectively, indicating multipliers for the number of credits wagered. Once a denomination and number of credits is selected, these payouts can also be displayed as monetary figures. For instance, if the denomination chosen is $1.00, and 10 credits are selected (making the total wager $10.00), the payouts 306 would be displayed as 0, $50, $100, $5,000, and $10,000.

Figure 5:
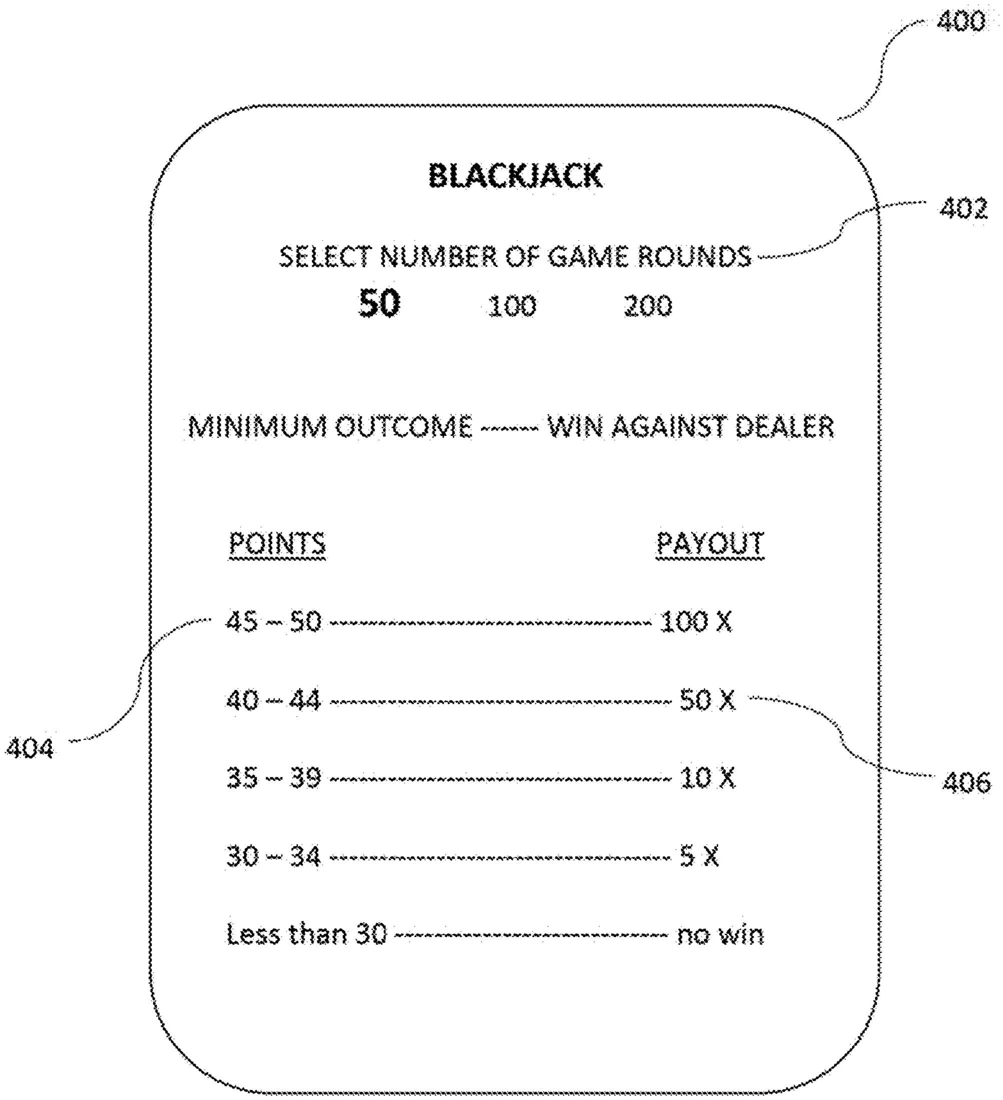
FIG. 5 is representative of an alternative paytable of the present invention for a second number of selected game rounds.

FIG. 5 shows an example paytable 400 for a game round selection 402 of 50. The point ranges 404 are shown as 30-34, 35-39, 40-44, and 45-50. The payouts 406 are also 5×, 10×, 50×, and 100×, respectively. A similar type of paytable could be shown for a 200 game round game or any other number of game rounds. Thus, it should be understood that the example of FIG. 4 and FIG. 5 are but two examples of a multitude of different possible alternative paytables. The quantity of point ranges may vary within the alternative paytable. The span of numbers within each range may vary. Differences in the number of ranges and the span of numbers within each of the ranges may vary as between game round selections if more than one selection of possible game rounds is offered. In addition to these variables, the criteria established for what is considered a game round win and therefore the awarding of a point may vary. The odds of receiving a point and therefore accumulating enough points to reach one of the threshold, payable ranges of points depends on what has been established as the minimum outcome necessary to achieve a point. The minimum outcome is set by the design of the game and is a part of the alternative paytable. These too can be made to be optionally selectable by the player.

In the typical game of Blackjack using a generally standard Blackjack paytable, a win is achieved when the player exceeds the dealer's hand without going bust (i.e. having a hand of cards that exceeds 21 in aggregate count). The payout is generally 1:1 (i.e. a win of one credit for each credit wagered) for a win against the dealer and generally 3:2 (i.e. a win of three credits for every two credits wagered) for a designated "Blackjack" or a two-card "21" outcome (when the dealer does not have the same). A payout, a push, or a loss occurs for each play. Using the alternative paytable of the present invention, a point can be provided for any and all "wins" against the dealer, as shown in FIG. 4 and FIG. 5, be it any combination of cards that are superior to the dealer's combination of cards, a combination remaining at or below 21 when the dealer busts, or a designated Blackjack or two-card 21 outcome (which pays out 3:2 in a many standard paytables). If the player does not meet any of those criteria for a given game round, the player does not receive a point for that game round. In those embodiments, double downs and splits are available but provide no advantage except that, with regard to splits, one or more additional chances are provided to receive the one point for that game round. Therefore, if any of the split hands are won, the player is awarded a point, regardless of the results of the other hands. A mathematically desired and designed return to player is thus achieved using this point system in association with the point or point ranges and payouts provided in FIG. 4 and FIG. 5. Although the payoffs are linear as between the game round selections in the examples of FIG. 4 and FIG. 5, they need not be. The operator, while providing a number of game round selections, may also wish to incentivize the player to select the lesser number of rounds so that they complete the set sooner and, from the operator's point of view, hopefully choose to play again. Alternatively, they may wish to keep the player on site longer if the operator of the casino is an online casino so that the player will view in-game advertisements in ad windows adjacent the game window for a longer periods of time. Regardless, the payoffs for one or more of the payable point ranges could be increased with a decrease in game round selection (or vice versa), or the one or more of the number spans within the numbers ranges may increase with a decrease in game round selection (or vice versa). This increases the RTP and incentivizes the player to choose the lower (or higher) game round selection. Other variables can be altered as would be apparent by those skilled in the art to help incentivize play and offer different formats for these types of alternative games.

Figure 6:
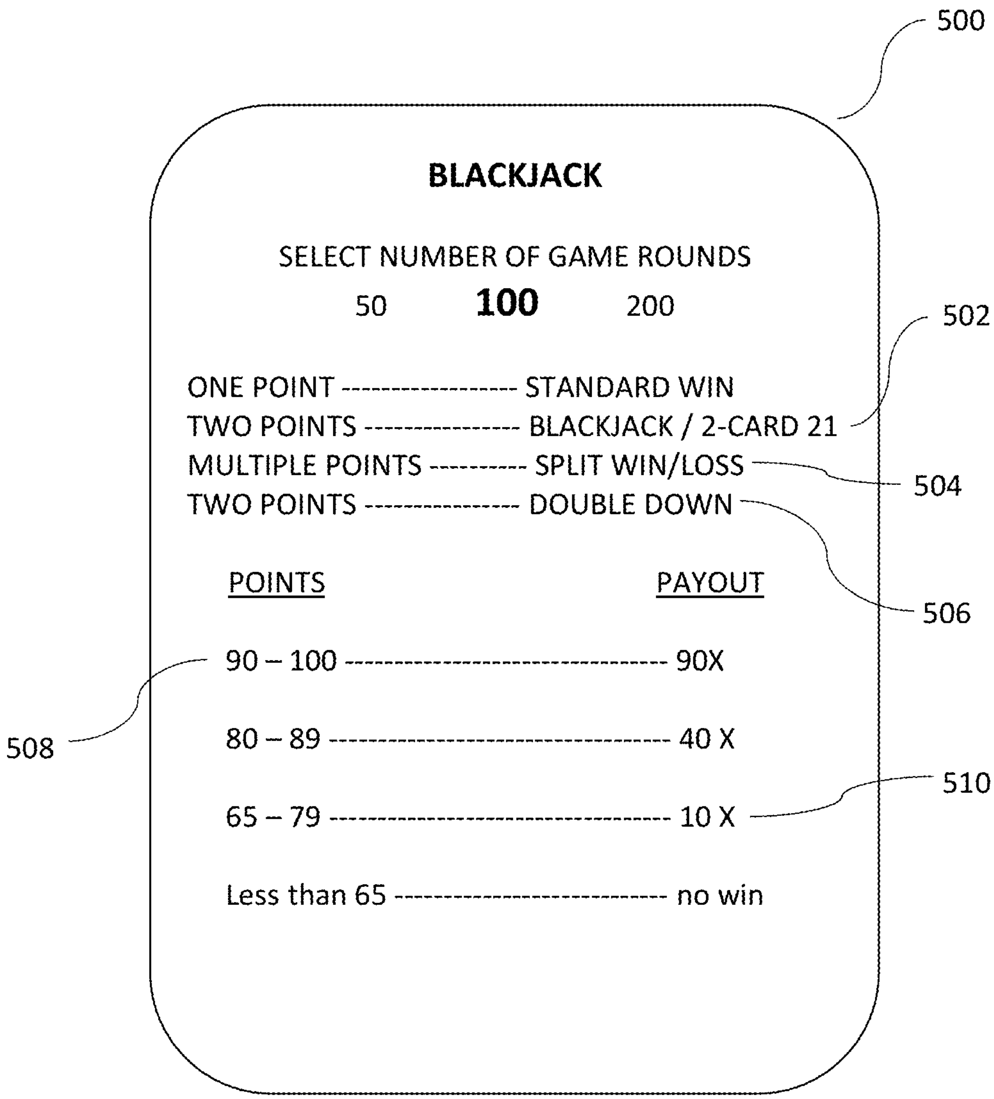
FIG. 6 is representative of another embodiment of an alternative paytable for the game of blackjack.

FIG. 6 displays an alternative paytable 500 using a point system modified to generate two points when a blackjack or two-card 21 hand is dealt 502 (and the dealer is not dealt the same), the ability to obtain additional points for split hands 504; a point for every win that exceeds the losing hands, and the ability to obtain two points when doubling down 506. The RTP would necessarily increase given the same point ranges 504 and payouts 506 of FIG. 4 and FIG. 5. This is due to the fact that for the same parameters; the prescribed point ranges, payouts and cost to play, the player is given a greater probability per round and per alternative game to achieve more points. Therefore, the payout percentage is higher. To adjust the RTP so that it is returned to the desired percentage (or thereabouts), the game is thus re-designed to modify the quantity of point ranges 508 and the payout awards 510. Other parameters could also be modified in yet another paytable such as the point spans and/or the cost to play for a given number of game rounds. Any one or more of these parameters can be modified as would be known by one skilled in the art to place the RTP back to the desired percentage. Furthermore, as mentioned above, in an embodiment of the invention a player can be provided a selectable choice as to not only the alternative paytable, but the minimum outcome(s) associated therewith. In the present example referencing the game of blackjack, the player can select to generate one point when a win—any win—is achieved; or the player can select to generate one point for all wins except for winning double downs and two-card 21 hands, which generate two points. In the latter, the alternative paytable would have to be adjusted, accordingly, to ensure a desired RTP. As will be further discussed, this can occur by modification of any number of different variables associated with the alternative paytable.

When the game rounds consist of Blackjack, modifications to the paytable to bring the RTP back to a desired percentage need not be substantial. This is because Blackjack is a low volatility game. Volatility is a measure of the rapidity in which a player can win or lose. In Blackjack, the probability of obtaining a winning outcome is on nearly the same order as the probability of obtaining a losing outcome. For a standard game of Blackjack, the probability of a winning outcome is approximately 43% while the probability of a losing outcome is approximately 48%. The probability of a push is approximately 9%. Additionally, the payoffs range from a loss of wager (i.e. 0:1) to, generally, a return of 150% of wager or a 3:2 payoff, which is awarded upon the occurrence of a Blackjack or other two-card 21 hand dealt (and the dealer has not received the same). The game predominantly pays 1:1, as two-card 21 hands have only a 2.4% probability of occurrence (with a slightly lesser probability of winning due to the injected odds of the dealer receiving the same during the same hand). Thus, if the point system used attempts to generally follow what would be a win and what would be a loss in a standard game, given the lack of volatility in Blackjack, modifications to the point system would generally not alter RTP to a significant degree. Again, this is only if the point system in the alternative game attempts to generally follow the win/loss outcomes of the standard game. And the alternative game outcomes should attempt to generally follow the outcomes of the standard game, else the game rounds of the alternative game might be too different from the standard game and create confusion with a player that is really familiar with the standard game and its respective outcomes. The first described point system, above, and shown in FIG. 4 and FIG. 5, generates one point for each win, regardless of whether the win is based on a two-card 21 hand or a double down, closely resembles the win/loss outcomes of the standard game, but on a lesser percentage return basis given the ability to obtain returns slightly higher than a 1:1 return for some outcomes. The second described point system, above, and shown in FIG. 6, generates one point for any win but two points if the win is based on a two card 21 hand or a double down, and the additional chance to win extra points from split hands, also closely resembles the win/loss outcome of the standard game but on a somewhat higher percentage return basis than one would receive from the standard game. Thus, in keeping the point system within the realm of the win/loss outcome of the standard game, there should be relatively modest changes in the RTP for point system differences such as the two described. This is not so much the case with a higher volatility game, such as five-card draw poker. A typical standard paytable in a Jacks or Better five-card draw poker game is as follows:

| Hand | Payout |
|---|---|
| Royal Flush | 800 |
| Straight Flush | 50 |
| Four of a Kind | 25 |
| Full House | 8 |
| Flush | 5 |
| Straight | 4 |
| Three of a Kind | 3 |
| Two Pair | 2 |
| Jacks or Better | 1 |

Figure 7:
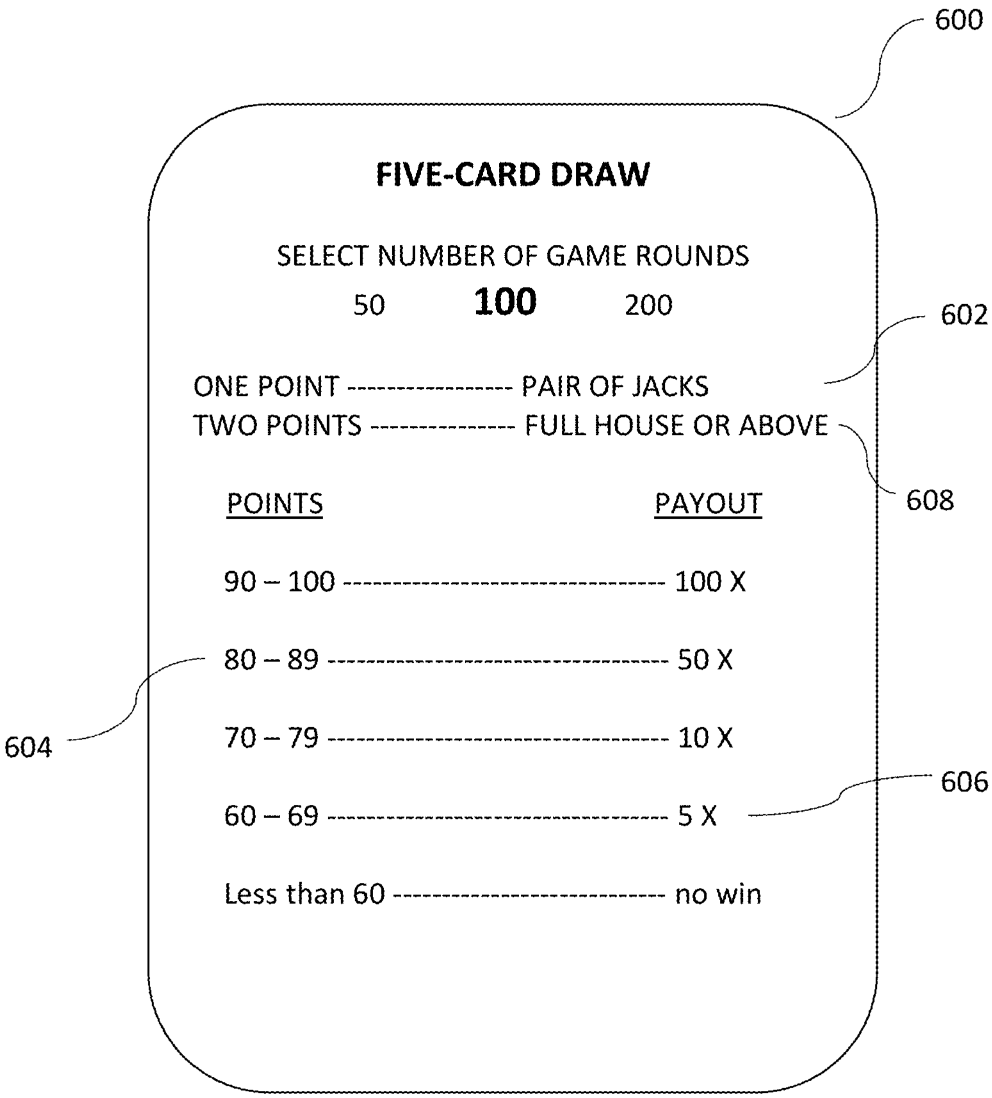
FIG. 7 is representative of another embodiment of an alternative paytable for the game of five card draw.

Due to the extreme range of payouts, an alternative paytable for an alternative game that uses this five-card draw game as game rounds cannot truly remain within the realm of the win/loss outcome of this standard paytable. In the alternative game that uses five-card draw poker for game rounds, the minimum outcome for the generation of a point would best be determined such that the payable point ranges are perceived by the player to be attainable; i.e. the payable point ranges would be similar to those shown in FIG. 4, FIG. 5 or FIG. 6, and not perceivably unattainable point ranges such as, by way of example (for a 50 game round selection), 45-47, 48-49, and 50, while maintaining a desired RTP. In other words, a balance must be established in the design of the game to ensure it remains appealing to players by making it exciting and by providing apparently achievable outcomes, while ensuring that the RTP is maintained at a desired percentage. Referring to the alternative paytable 600 of FIG. 7; here Jacks or better 602 is deemed the sufficient minimum outcome to achieve the desired RTP using the point ranges 604 and payouts 606 for each of the selected game rounds. But if the RTP were too low using that point system, as previously mentioned, any of the quantity of point ranges, the point spans, the payouts or the cost to play could be modified to achieve the desired RTP. Given the high volatility in the game rounds used for this alternative game, many wide-ranging modifications could be implemented to achieve the desired RTP. Perhaps the simplest modification would be to award additional points for one or more outcomes. For instance, for the low probability outcomes of a full house and above 608 (i.e. four of a kind, straight flush, and royal flush), two points could be generated. If this was insufficient, perhaps two points could be awarded for a straight and above while three points for a full house and above. Conversely, if the RTP is too high using Jacks or better as the minimum outcome to achieve a point, the minimum outcome could be increased to, for example, a pair of Aces or better. If the game designer wished to maintain Jacks or better as the minimum outcome, there would be plenty of other modifications that they could effect to bring the RTP to the desired percentage.

Another high volatility game is slots. The returns in some standard paytables can range from losing one's wager to being awarded a portion of the wager to being awarded a thousand or more times the player's wager. Designing an alternative paytable for game rounds that embody a slot game requires the selection of a line-symbol combination outcome or other form of slot game outcome having a certain threshold probability of occurrence. Upon the occurrence of that outcome or another defined line-symbol combination or other outcome having a lower probability of occurrence, the player receives one or more points. As with other games used as game rounds, the established point system could place some variation of the number of points received for various outcomes. It should be noted, however, that too much variation in the number of points generated for various outcomes would diminish the alternative game. On the other hand, if there was too little or no variation on the outcomes for this high volatility game, it might also diminish this standard game as a game round as the player might be put off at getting the same number of points for what in the standard game would be highest probable payable outcome and the lowest probable payable outcome. But it is a feature of the present invention that the player slowly accumulate points during a session of game round plays until a final outcome is achieved; therefore in contrast to a standard game which, as mentioned above, quickly cycles between final outcomes and has the potential effect of quickly reducing a player's available funds. Thus is there is too much variation in the award of points in game rounds of an alternative game, the outcomes could be determined in an alternative game in the early stages of game round play or from only one or a limited number of distinct game rounds, and it would defeat the purpose of having a sustained, relatively lengthy gaming experience with an increase in excitement as the game rounds progress. Although some variation in the awarding of points may be desired by the game designer to achieve a slightly closer association to the standard game and/or to simply add some variety, too much variation will cause the alternative game to resemble the standard game and the aspects of the standard game that are intended to be avoided by the alternative game of the present invention.

Figure 8:
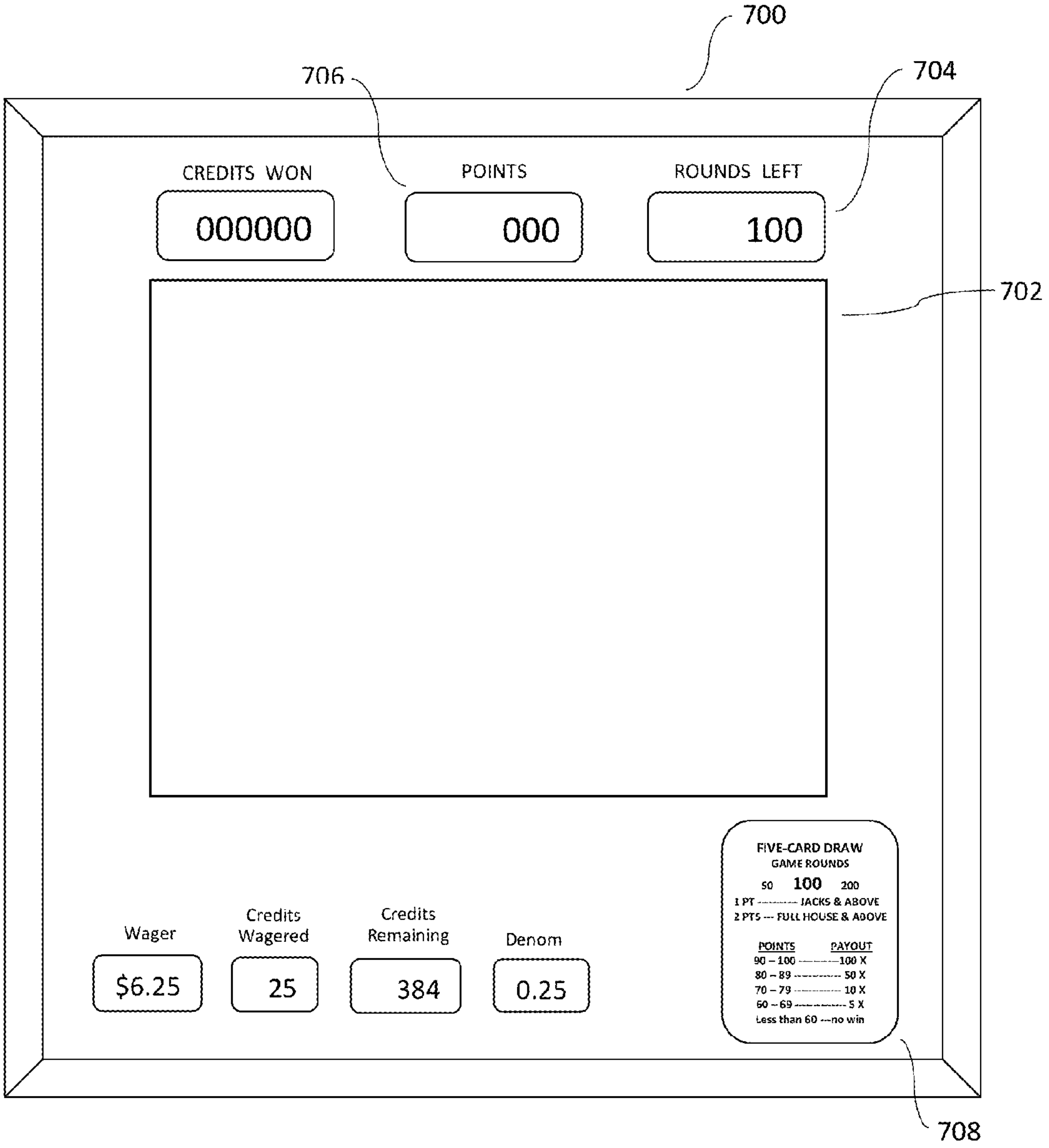
FIG. 8 depicts a representative layout of the display screen for the present invention.

Referring to FIG. 8, although the layout of the display screen 700 is generally the same regardless of game, there will be some differences stemming from the type of game are apparent. However, regardless of the layout of the various display windows or the particular game being played, in the present invention, at least two additional display windows, a game round meter 704 and point counter 706, associated with the present invention, are shown in the display screen. In a preferred embodiment, game round meter 704 is a meter showing a remaining number of game rounds. The game round meter 704 initially shows a number of game rounds selected for play (i.e. the game round set) and decrements the meter after the completion of each game round. In an alternative embodiment, the game round meter 704 shows the number of game rounds played and thus increments the meter after the completion of each game round from an initial position of "000". The game round meter 704 increments or decrements by a single digit after the completion of each game round.

Point counter 706 is a meter indicating a number of points accumulated through each game round. Points correspond with a positive outcome from each of the game rounds. The alternative paytable 708 establishes which outcomes from a game round are positive. For the five-card draw poker game described above, a final hand consisting of a pair of Jacks or better indicates a positive outcome and the award of one point. The meter in point counter window 706 would increment by one digit the outcome of a pair of Jacks or better. If a hand inferior to a pair of Jacks is the outcome for a particular game round, no points are awarded and the counter remains in the same state as existed in the prior game round. Although in one embodiment a positive outcome, as defined by the paytable, provides the player one point, other embodiments may provide different point tallies for different game round outcomes. Referring to the alternative paytable 708, a pair of Jacks or better up to and including a flush (which is inclusive of two pair, three of a kind and a straight) will award one point; a full-house and four-of-a-kind awards three points; a straight flush awards five points; and a royal flush might award 10 points. This alternate paytable emphasizes the points made above. Therefore, there is some variety in the points awarded to allow some proximity to the standard game paytable and some added variety to the alternative game, while maintaining the features of the present invention. Since the goal of the alternative game is to accumulate a threshold number of points, as defined by the paytable 708, on or before play of the last game round, the additional points, if awarded, moves the player closer and more quickly towards that goal (but not nearly as fast as would the standard paytable if the standard paytable were to double as the alternative paytable). Additionally, feature outcomes; for example a special symbol or card, a unique combination outcome, the results of a triggered bonus game, or simply a random award, may be implemented into the alternative game or a system communicatively linked to the electronic gaming machine in which the game resides to yield a different or additional increment or decrement that is dependent on the occurrence of the feature. This, too, could be included for the primary purpose of adjusting the RTP to the desired percentage.

In the example of FIG. 8, 100 game rounds were selected and none have thus far been played, as indicated by the "100" displayed in game round meter 704. Since no game rounds have been played, no points have been accumulated. This is reflected by the "000" displayed in point counter 706, although "000" could be displayed even if a number of game rounds had been played without any positive outcomes.

Figure 9:
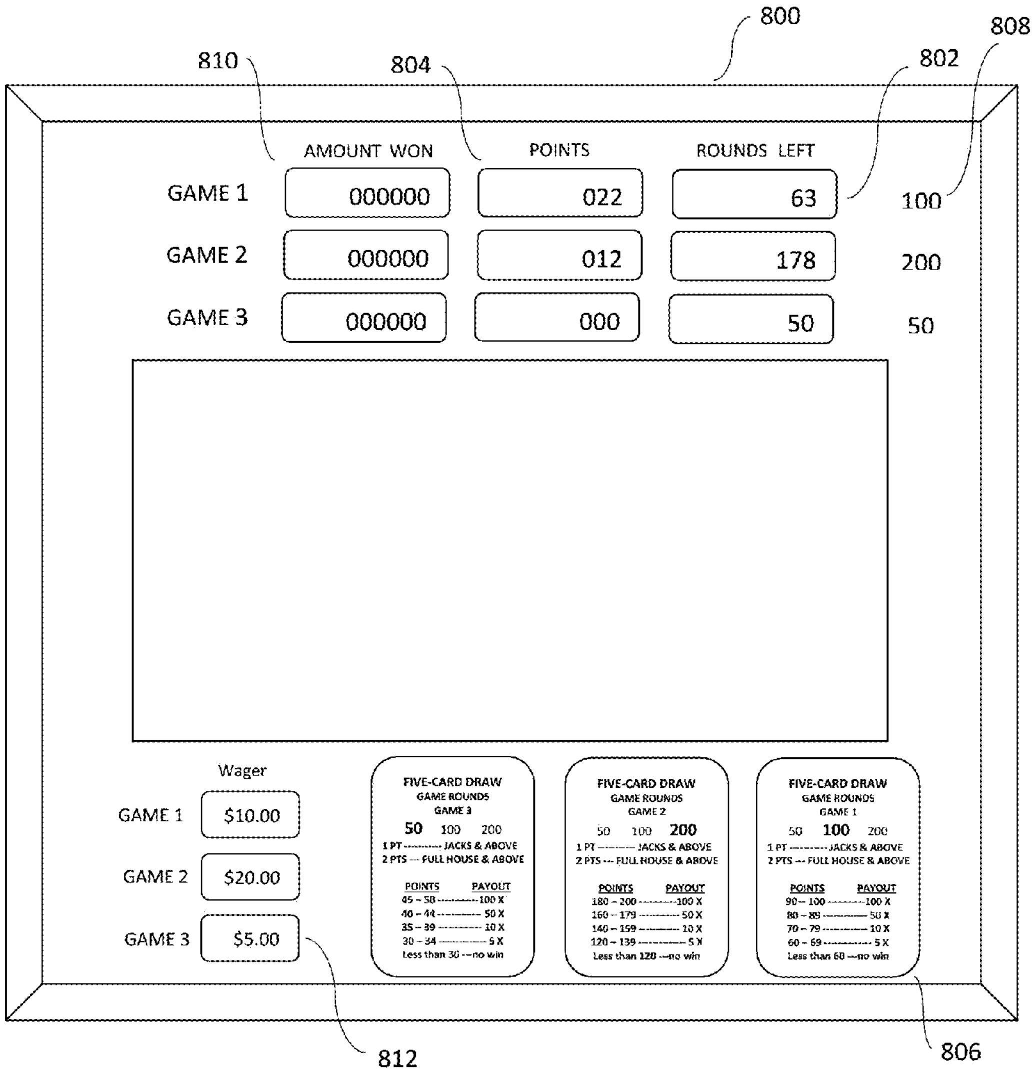
FIG. 9 depicts a representative layout of the display screen for an embodiment of the present invention that provides for multiple, concurrently-played games.

In the embodiment of FIG. 9, multiple games are enabled for concurrent play. Display screen 800 can include multiple sets of game round meters 802 and point counters 804, preferably in a visually stacked manner such that one set of windows resides just above or just below another set of display windows, as shown. In this embodiment, the player can play multiple games at one time and can therefore select more than one set of game rounds. The player can select, as limited by the parameters of the games and the device in which they are implemented, the number of game rounds for each game set. For instance, as shown in FIG. 9, the player can select up to three different game sets, any of a 50, 100 or 200 round game set. In the embodiment of FIG. 9, the player can select one or up to three games. Each game can be any of the selectable number of game round sets. So, all games could be 50 game round sets or they could be varied, as shown in FIG. 9, consisting of 100 game rounds for Game 1, 200 game rounds for Game 2, and 50 game rounds for Game 3. The sets of game rounds from Game 2 and Game 3 can be selected at the same time as Game 1 or anytime thereafter. The selections are made through the touchscreen or other input devices. If all games are selected for play as shown, and at the same time, Game 3 with 50 game rounds will complete first, Game 1 with 100 game rounds will finish second and Game 3 last with a set of 200. A new Game 3 can then be selected before the completion of Game 3 or Game 2, and a new Game 1 can be selected before the completion of Game 2. The game round sets for the subsequent games need not be the same as in the prior game. Thus, a game associated with one game round set will conclude while one or more other games would continue. This embodiment provides for ever active games regardless of the completion of another up until no further game sets are selected for play prior to the completion of the last active game set.

In addition to game round meter 802 and point counter 804, another display window 808 can be included in display screen 800 to statically display the number of game rounds selected. This number would remain throughout the play of the game. In the example of FIG. 9, the display window 808 shows the number "100" throughout the entire play of Game 1, "200" for Game 2, and "50" for Game 3. These number might then change after completion of the game if the player elects to play another Game 1, Game 2 or Game 3 and selects a different number game round set. This allows the number of game rounds selected to be associated with each set of game round meters 802 and point counters 804. The device may be limited to the number of game round sets that may be active at any one time (and therefore the number of available display windows), but when one game round set is completed, another may be selected to take its place. In this fashion, numerous games, each having a distinct number of game rounds and initiating from a particular game round, will be ongoing until the player selects no further games and the last game round of a game round set has been played from the last active game. Regardless of the number of active games active, each game will draw its results from the outcome of the game round being played at any given time; albeit in accordance with the given paytable selected for that game, which may vary from game to game. If sufficient points are accumulated, the award associated with that level of points for the given game will be displayed in window 810. Upon the selection of a new game to replace the previous game or upon "cash out", the winnings will be distributed to the player.

As shown in FIG. 9, 100 game rounds were selected by the player for Game 1. The game round meter 802 shows 63 game rounds remaining. Thus, the player has played 37 game rounds. The number of points accumulated, 22, is shown in the points counter 804. For Game 2, 200 game rounds were selected, 22 have been played and 12 points have been accumulated. For Game 3, 50 game rounds were just selected and not game rounds have thus far been played. The point totals needed to achieve winning outcomes for each of the Games in accordance with the number of game rounds selected is shown in the paytables 806. There are four point range levels for each of these game round set selections, with each level associated with a different award. The higher the level, the higher the award. The player's wager for each game is shown in the wager window 812. In this example, the actual wager is shown which is input using the touchscreen or other input associated with the enabling device.

Figure 10:
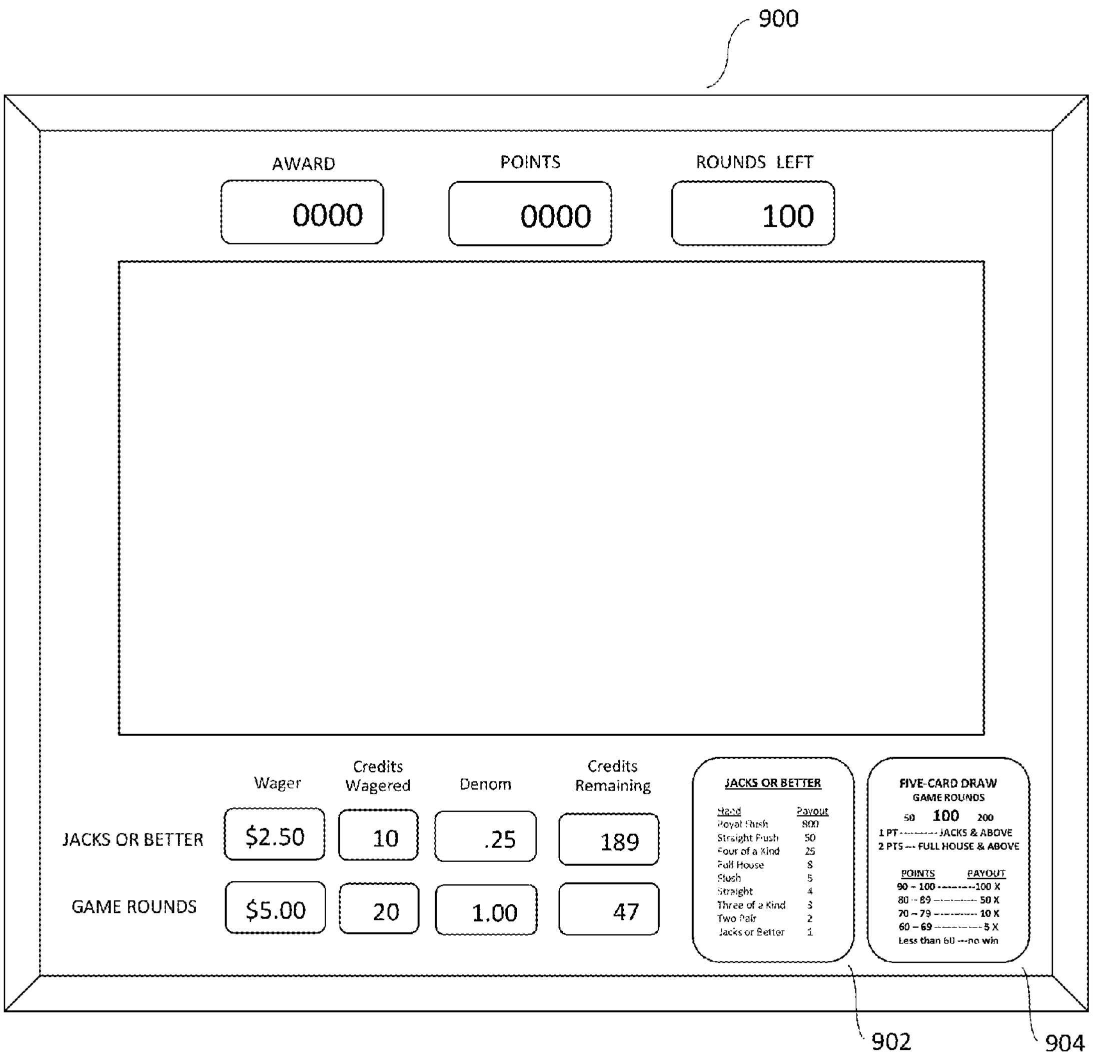
FIG. 10 depicts a representative layout of the display screen for an embodiment of the present invention that provides for standard and alternative game play.

In another embodiment of the invention, the alternative game and alternative paytable can be additive of a standard game and standard paytable. Therefore, at the election of the player, a standard game is activated (or vice versa). The player then initiates play of both a standard game and the alternative game (assuming a wager was also made on the alternative game). FIG. 10 shows an example display screen 900 layout of an embodiment that uses both a standard paytable 902 and an alternative paytable 904. Each outcome is the same for both the standard and alternative games, but it is treated differently in accordance with the rules of the standard game and alternative game. The outcome is assessed against both the standard paytable 902 and alternative paytable 904. When the outcome is a winning outcome in accordance with the rules and paytable of the standard game, the player receives an immediate award in the amount associated with the standard paytable for the given outcome and in accordance with the wager made. If the outcome does not align with any winning outcomes of the standard paytable, no award is provided. Concurrently, when the outcome is a positive outcome for a game round as assessed against the alternative paytable, the player is awarded the points associated with that outcome. In this particular embodiment, the player retains the option of wagering on the standard game throughout the play of the alternative game. Thus, two separate wagering events take place simultaneously. The first, being the standard game, which provides a final outcome upon conclusion of the game. The second, being the alternative game, which provides a round outcome which is merely one step of many until the last round is played and the final outcome determined.

Figure 11:
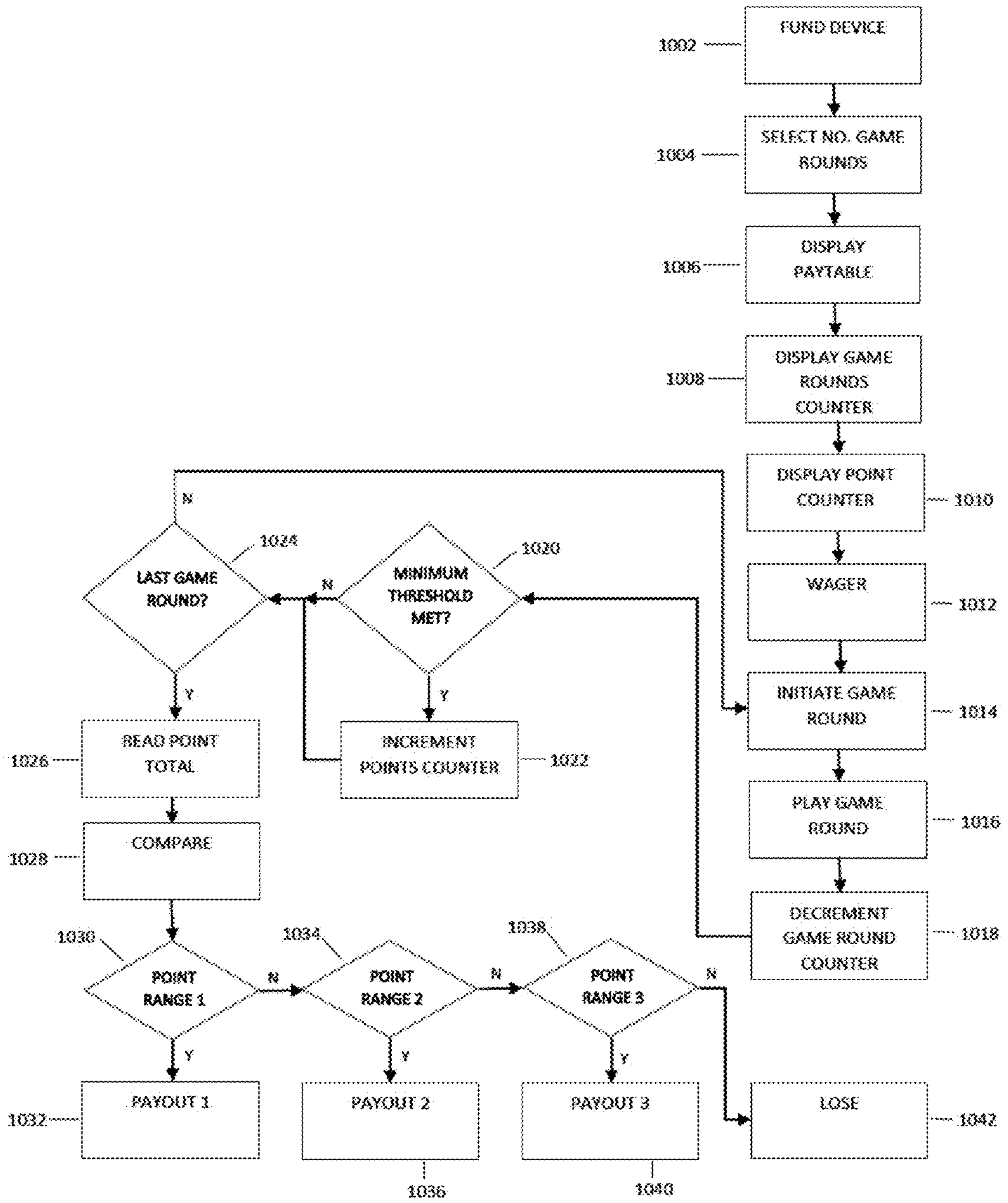
FIG. 11 is a flow diagram showing a representative method of one embodiment of the present invention of alternative wagering in operation.

In the present invention, the game is initially set up for play in a manner similar to typical wagering games and therefore the initial set up will only be generally discussed here. Referring to the flow diagram of FIG. 11, the player funds the device 1002 with monies (or virtual credits if a social gaming application) so that credits or amounts can be wagered, whether the device is an electronic gaming machine, a personal computer or mobile device in communication with an online casino via the Internet, an electronic table, a live table, or some other device or means for accepting a player's funds and allowing use of such for wagering on the outcome of game play. The player then selects the number of game rounds 1004 desired for the game. In some embodiments, the player may select more than one game, either concurrently with the selection of the first game or later after a number of game rounds have been played, and additionally selected games may have the same number of game rounds or a different number of game rounds. Additionally, in some embodiments the paytable, as it relates to (i) the threshold level(s) of points necessary to achieve an award, (ii) the outcomes necessary to achieve and accumulate points (and in some embodiments, to also deduct points), or (iii) both, is also selectable by the player; and all of these selectable items can vary based on the selected denomination or total wager amount. Thus, as discussed above, any of (i) or (ii) can be modified to provide a higher RTP for a higher denomination or total wager as incentive to select a higher denomination or make a higher credit wager. In other embodiments, the player can also select the type of game rounds to be used with the game; i.e. blackjack, poker, slots, roulette, baccarat, keno, etc. In the embodiment of FIG. 11, only one game is available for play by the player and multiple games cannot be played concurrently. Further, the game round type is not selectable nor is the outcome paytable that differently defines the outcome(s) that award point(s). This is a preferred embodiment, as providing too many variables for selection can make the game confusing to some players and less desirable to play. Some variety is generally appreciated by the player, but too much can detract and cause some players to turn away.

After selection of game rounds 1004, the applicable paytable will be displayed 1006 showing one or more point ranges and the payouts associated with each. Since, per this embodiment, the wager has not yet been made, the associated awards will most likely default as a result of the game program to the values associated with the previous wager. Also displayed is a game round counter 1008 showing the number of game rounds to be played and, in another embodiment, the number of games rounds already played in the given game. In the former, the number of game rounds selected will be displayed. For the later, a null value will be displayed. Yet another point counter display window will display the number of accumulated points 1008. At initiation of the game has this value will be zero.

The player wagers 1012 an amount to play the game. Prior to making the wager 1012, a denomination can be selected through the applicable input mechanism of the applicable device thus converting the funds to a number of credits consistent with the amount of funds provided and said denomination. Once the wager 1012 is made, the awards associated with the displayed point ranges will update to reflect awards associated with the value of the wager. As has been previously discussed, these values need not increase linearly. Therefore, a wager of $5.00 need not necessarily increase the awards that would otherwise be associated with a wager of $1.00 by a factor of five. A wager of $5.00 may be designed to provide a RTP greater than a wager of $1.00 and a wager of $20.00 may be designed to provide a higher RTP for both. This type of increase in the RTP incentivizes the player to wager more.

Once the wager is made, the game is active and the player initiates a play of a game round by providing input 1014 through the applicable input device. The game round is then played 1016. After playing the game round 1016, the game round counter is decremented 1018 (or incremented, as the case may be). Next, the game logic assesses the outcome of the game round to determine if the game round outcome has met the predefined minimum threshold outcome 1020. If the minimum threshold outcome has been met, the counter display window will increment 1022. As previously discussed, the number of points and therefore how much the counter display will increment may differ on outcome. Additionally, certain outcomes can be designed as a penalty and cause a decrement to occur. The game design can include bonuses or other features that may further cause the counter display to increment up various outcomes of such bonuses or features, and to various degrees, but in the simplest embodiment of the invention, the point counter will increment by one unit upon meeting the minimum threshold outcome with no other result.

After determining if the minimum threshold has been met, the game logic makes another determination to see if the game round played was the last game round 1024 in the set of game rounds comprising the game. If not, a new game round is initiated 1014 by providing input to the applicable input device and the process repeats. If it is determined that the last game round in the set of game rounds was played, the game logic reads the accumulated point total 1026, which is displayed in the point counter and compares 1028 the accumulated point total to the payable point ranges defined for the game. Assuming the game in this embodiment includes three separate payable point ranges, the game logic makes a determination to see if the accumulated points total is within a first payable range of points 1030. If it is, the award associated with that first payable range or points is awarded to the player 1032. The game logic makes another determination to see if the accumulated points total is within a second payable range of points 1034. If it is, the award associated with that second payable range of points is awarded to the player 1036. Another determination is made in regards to the a third payable range of points 1038 and if the accumulated points total is within that third payable range of points, the award associated with that third payable range of points is awarded to the player 1040. Should none of the determinations find that accumulated points total to be within one of the three payable point ranges, then the player loses 1042, with the wager lost and no award provided.

The player may choose to play again. If so, if sufficient funds remain credited to the device, the player would re-initiate play of a game by again selecting the number of game rounds 1004 and providing a wager 1012. The process would then continue in a similar manner.

As previously stated, the rate of play between successive game rounds of the alternative game, whether fast, slow or measured, is not a required feature of the invention, although it is preferable that it be one or the other depending on the commercial implementation of the invention. In the embodiments thus far described, it is generally preferred that there be a minimal length of time between successive rounds. There are advantages in those embodiments in having a quick turnaround between rounds, some of which were previously described. But there can also be an advantage in inherently having or requiring a significant or measured gap of time between game rounds and conversely a disadvantage in a quick turnaround time. Thus, in one embodiment, by removing or reducing the high frequency, cyclic game round play of the embodiments thus far described, where the player's predilection is to play one game round after the other in a continuous manner with a minimal time gap between successive game rounds, the present invention can be commercially implemented to have a person repeatedly make visits to a physical or virtual site; e.g. a bricks and mortar type physical structure or an Internet website. The person is awarded for such visits through the offer of one or more games rounds of one of the afore-described alternative games for play each time the person makes the visit. This incentivizes the person to make continuous, repetitive visits since a number of game rounds must be played to complete the alternative game.

Similarly, a person can be incentivized to conduct a transaction multiple times through a given provider or entity providing an offer; a transaction that otherwise could be performed through a variety of providers. Thus, each time the transaction is conducted, the person is provided game rounds of an alternative game for play incentivizing the person to conduct the transaction through that same provider each time in order to complete the alternative game.

For these embodiments, the provider can impose time limits so that the player is limited by an interval of time, such as once per hour, once per week, or any other regular (or irregular) interval, when visiting the location or conducting the transaction, until such time as the number of given game rounds associated with the alternative game is completed. The player can be provided the opportunity to play more than one game round per visit or transaction, but if the goal is to increase visits to the location or the number of transactions with the provider, it is be preferred that the number of game rounds played per visit or per transaction be significantly less than the total number of game rounds of the alternative game. This will encourage numerous visits to the same physical or virtual location, or transactions consistently made with the same provider.

The invention is preferably provided in the form of a sweepstakes. The sweepstakes is offered to give participating persons the opportunity to play at least one game round each time the person visits a designated site, whether it be geo-located within one or more physical structures or virtually located at one or more designated online virtual addresses, or each time a person conducts a transaction with a designated provider. After the applicable number of game rounds are played, which coincides in some respect with the number of visits or transactions, the sweepstakes, as provided through the alternative game, concludes. The sweepstakes can alternatively be implemented as a contest if the game round includes an element of skill. Any embodiment herein can be offered as a contest if there is an element of skill involved with the game or event. This is what sets it apart from a sweepstakes. What is considered an "element of skill" that distinguishes the two is generally determined by rules and regulations of local jurisdictions, which further sets the legal parameters for providing such.

Figure 12:
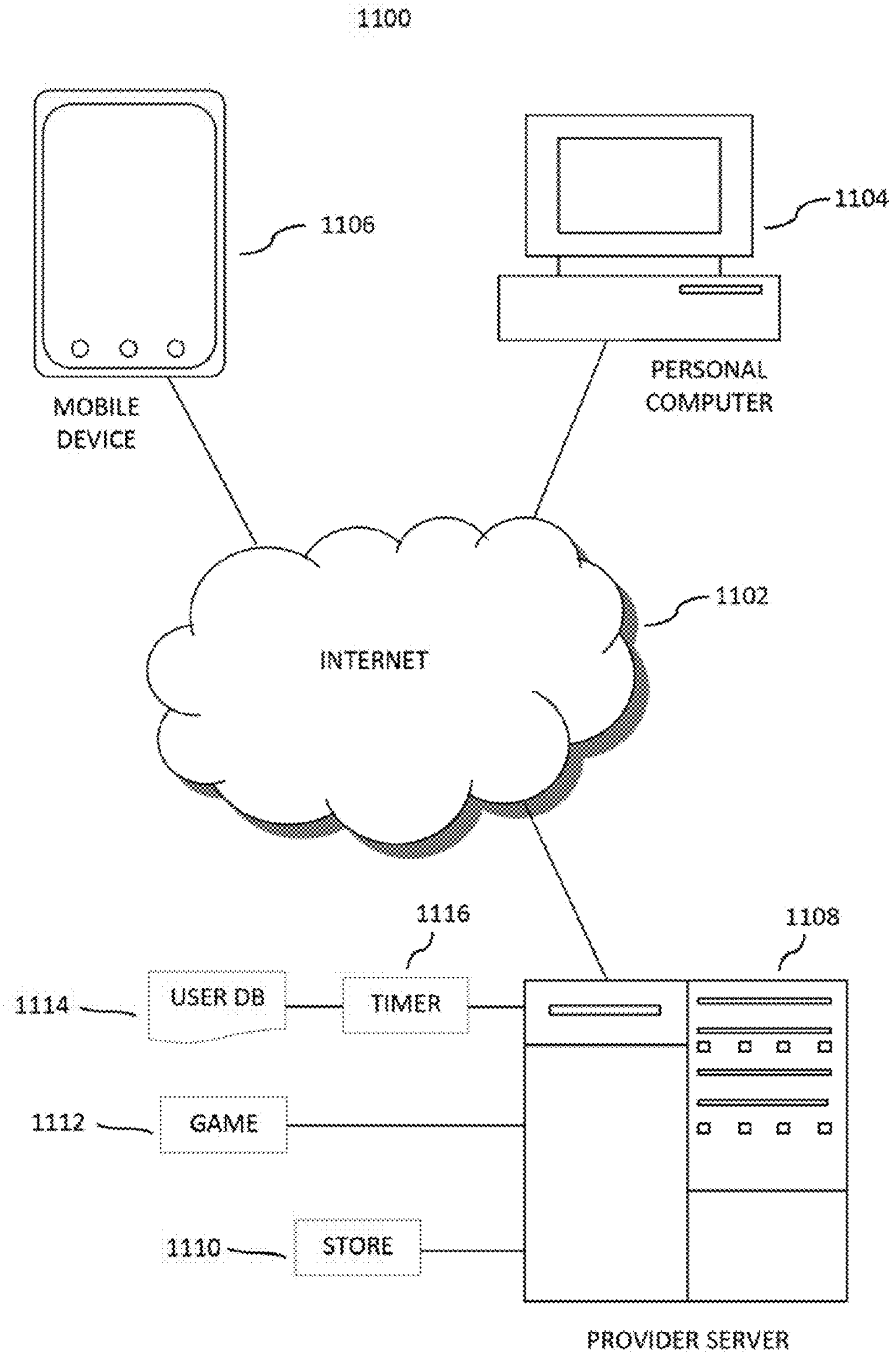
FIG. 12 is displays a network-based system for providing a sweepstakes.

When performed in association with network-based system, the invention relates to that of FIG. 2. One distinction, however, is that since there are no wagers or any transfers of funds, secure electronic funds transfer (EFT) provided by the Financial Provider Server 106 is generally unnecessary (although may be implemented for the purposes of delivering awards or to conduct the basic transactions associated with the virtual site). FIG. 12 depicts a system 1100 for providing a sweepstakes in accordance with the present invention. In this embodiment, as in the embodiment depicted in FIG. 2, the Internet 1102 serves as the communications conduit between the various components connected thereto. The components include computerized devices similar to those of Internet-based system of FIG. 2; i.e. personal computers 1104 and mobile devices 1106 that have the functionality to communicate using network-based protocols such as TCP/IP, an Internet-based protocol, or other methods known in the industry. Personal computers 1104 or mobile devices 1106 establish communications with the provider's server 1108 by identifying the server's unique uniform resource locator (URL) or IP address through a web browser and transmitting a call. The provider can be a virtual storefront, an online casino, sports book, or any other online entity that wishes to drive traffic to their virtual site. In another embodiment (not shown), the provider can be associated with a physical location, such as a land-based casino. In such an embodiment, a person would be required to physically travel to the location to use the LAN-based network that resides there. The network would be comprised of many of the same types of components, but the system would be based on a LAN (local area network), linked to various devices primarily through physical cabling such as Ethernet, and the relevant devices linked thereto would consist primarily of electronic gaming machines and an associated player tracking system.

In the Internet-based embodiment of FIG. 12, a web browser initiates and enables communications through the Internet 1102 to the specified URL or IP address indicating the provider's server 1108 and website. Communication links to and from the Internet 1102 between the various nodes or components, including personal computers and mobile devices, are established via wire, such as coaxial cable, fiber optic cable, digital subscriber line (DSL), or other wired communication components known in the industry, or through wireless transmission such as satellite, Wi-Fi, cellular connection, or other such wireless sources known in the industry, or through any combinations of such. The established communication protocols, such as TCP/IP, are used to control data download and data upload, and to ensure the nodes can read the data being sent from other nodes. The server 1108 embodies, in the form of digitized content, data and computer coded instructions (i.e. software) held in one or more memory storage mediums all aspects of the virtual store or location 1110 and alternative game 1112, among other information. It should be noted that the virtual store or location and the alternative game could reside on different servers, or portions of the applicable software could reside on different servers or even on the personal computer or mobile device, but only one server storing the all of the online store 1110 and alternative game 1112 are depicted in FIG. 12.

Upon request by the person through entering of an IP address or URL in the browser retrieval field, data is streamed or downloaded to the personal computer 1104 or mobile device 1106 and the applicable content is shown in the display. In the present embodiment, the initial screen depicts the provider's storefront. Here, various indicia are displayed in an effort by the provider to advertise goods or services, and/or to direct the person to sub-level web pages that describe or allow for the purchase of such goods and services. At the initial web page, being the virtual store front, or at some other sub-level page there will exist a link to retrieve and access the alternative game. A user database 1114 stores information regarding the person and the status of the alternative game. This is accessed through the input of user identification information, such as a user I.D., password, number combination, or the like. Prior to being directed to the alternative game, the identification information is entered by the person. The computer code causes the generation of a dialogue box with entry fields to input the secure user identification information. By entering the user identification information, the person's account is identified and the alternative game status and applicable information is read into the game. This is required each time the person wishes to access the alternative game. Repeated visits are made to the site by the person to play game rounds of the alternative game with the game data variables changing from round to round and therefore for each such visit. If no user account exists, one is established prior to first accessing an alternative game.

A timer 1116 in association with the user account in the user database 1114 records when the patron has logged in to their account to play the allotted number of game rounds. Once the allotted number of game rounds has been played, the alternative game is disabled so that no additional game rounds may be played. The timer 1116 calculates the time between each user login. Each time the person logs in to their account, a computer program embodied in the server 1108 performs an operation to determine if the predetermined time period has been exceeded. If such period of time has been exceeded, the instructions enable an additional number of allotted game rounds to be played. If the timer period has not been exceeded, the alternative game remains disabled and cannot be played. The pre-determined time period may be any period of time as determined by the designers of the sweepstakes, and could be based not on a span of time, such as 24 hours between successive logins, or a segment of time such as per day, or any other time-based criteria that can be determined by the software of the sweepstakes programming.

To complete the alternative game, the person will use the network system at least the number of times that it takes to play all of the game rounds. If only one game round is allotted per visit and the alternative game is completed after 20 game rounds, then at least 20 visits will be required to the online virtual store. If ten game rounds are allotted for play each visit and 300 game rounds must be played to complete the alternative game, then the person will need to visit the online store at least 30 times. During each such visit, the person will, in addition to playing the game round, be presented with advertising, offers and incentives to conduct business with the store. If, instead of an online store, the provider of the sweepstakes is a virtual casino, the player will have be presented with the opportunity to play the games of the casino.

When the person completes an alternative game the computer coded instructions of the game determine that all game rounds have been played and then compares the score of the game to one or more predetermined scores. If the score of the game exceeds the one or more predetermined score, a prize is awarded in association with the sweepstakes. The prize could be for the first person to achieve such score, for the first number of persons to so achieve the score, or for all persons that achieve the score while the sweepstakes remains active. As mentioned, there can be more than one predetermined score. The higher score may provide a more valuable award such as a money, goods or services. A lower score may provide a less valuable award such as a lesser amount of money, lower valued goods or services, or a coupon for in-store or external use. The award can be delivered to the person electronically or by physical delivery, if sufficient information is or had been given to the provider, or may be picked up by the person at a physical location. Once the alternative game is completed, the provider may allow the person to enter the sweepstakes once again.

Figure 13:
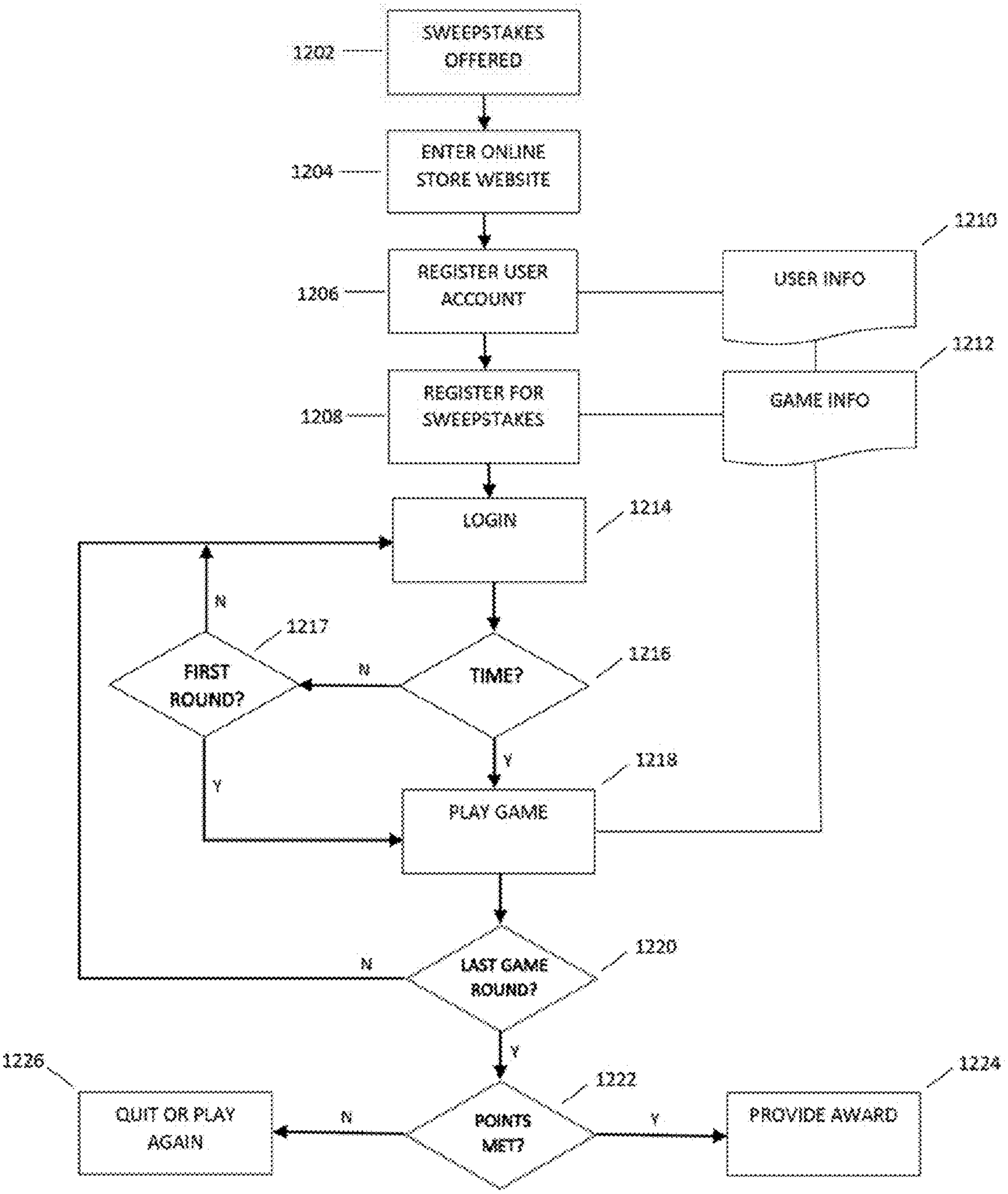
FIG. 13 is a flow diagram showing a representative method of one embodiment of the present invention in conjunctions with visits made to an online store.

Referring now to FIG. 13, an embodiment of the invention is presented as a series of steps. The sweepstakes is offered 1202 to encourage persons to visit an online store. Advertisements can be included within various web pages of an Internet browser, as commonly provided through methods and structures known in the art, to promote the online store. Hyperlinks embedded in the online advertisements bring the person to a specific web page of the store, preferably the store front, upon selection of the hyperlink. A sweepstakes may be advertised in conjunction with the online advertisement to incentivize the person to click on the hyperlink. The person enters the website associated with the online store 1204. Here, the person is offered the chance to register for the sweepstakes. The person is then directed to a different web page through another hyperlink where data is entered to register an account 1206 with the online store, including information to identify the person, such as name, address, phone number, and e-mail address, and login data, such as a user name and password, to allow the person or user to securely login to the account. Other information may be requested about the person, such as their areas of interest, hobbies, age, gender in order to identify what products and services the person might be interested in purchasing. The information is collected and stored in a database 1210 in a field associated with that person. Registration in the sweepstakes 1208 is then procured in conjunction with the establishment of the user account 1206. If an account had been previously established with the provider, only registration in the sweepstakes is required, but in association with such previously established user account. Login data is input by the person to access the previously established user account and to thereafter register for the sweepstakes.

After registration 1208, an alternative game is presented by download or streaming of game content to the person's personal computer or mobile device. The alternative game makes up the sweepstakes which is played in a manner similar to that of the alternative game. The primary differences are that an input of funds and a wager is not required, and the game is conducted in a time-controlled manner. The person is able to play the alternative game at their computer or mobile device. It can be played for the first time after registration in the sweepstakes 1208 or at a time thereafter. Each time the person wishes to play the alternative game, the person must be logged in 1214 to their user account. If the person has just registered for the sweepstakes, the person is logged in and can therefore play. After login 1214 by a person, a time determination is made 1216. The time determination checks the elapsed time since the person last initiated play of the alternative game and compares that to a pre-determined set period of time. If the elapsed time is less than the set time period, the alternative game is disabled and the person is not provided playable access to the alternative game until such time as the elapsed time meets or exceeds the set time period. If it is the first time playing, the elapsed time comparison is disregarded or positively determined 1217. If a negative determination is made, the person may nonetheless be given viewing access to the alternative game, but only for the purpose of allowing the person access to see the game's current status. The predetermined set time period allows the provider to control the minimum time period between plays and thus provides a measure of control on how often the person may play in the sweepstakes when visiting the online store. The sweepstakes is thus designed to prevent further play upon re-visit to the online store by the person until the pre-determined set period of time has passed (e.g. one hour) or upon reaching a predetermined timed benchmark (e.g. a new 24-hour day has begun). This prevents a person from pursuing unproductive (from the provider's point view) behaviors such as navigating away from the online store and then immediately navigating back for the purpose of playing additional game rounds. The game round allotment per visit is designed so that persons will re-visit the online location to see new products and offerings on a regular basis and after the web page displaying and offering such has been updated. The predetermined set time period thus gives the online store the time necessary to update the web pages so that the person will see such new products and offerings that they may not have seen during their previous visit. If no time controls existed in regards to play of the alternative game rounds, the person could play the game rounds almost as fast as they could logout and log back in to the virtual store. Such offerings might be provided in association with the person's particular interests as indicated by the information provided by the person and stored in the user account 1210 and the person's online search and viewing patterns to provide a higher probability of purchase. Various commercially licensed and proprietary software algorithms can be used to match a person's online search and viewing patterns to advertisements and the like that the algorithm derives would hold the most interest for the given person. The online store will thus change the site offerings on their web pages of the website periodically to provide the person and potential customer with a view of the different products and/or services for sale. The sweepstakes acts as a catalyst to get the person to view these items and to increase the likelihood of a financial transaction benefiting the provider that will be undertaken in addition to person's play of the sweepstakes game.

By registering for the sweepstakes 1108, a record in the game information database 1212 is established in association with the user account. The game information database 1212 enables game results specifically associated with the play to get recorded to data input fields for a given person in the game information database 1212. When the person logs in to their account, the current alternative game status is accessed and provided, either in a play mode or view mode, only, depending on the results of the time determination, to the person's computer or mobile device.

After the person has logged in 1214 to play the alternative game and it has been determined that the predetermined set time period has been met 1216, the person is provided access to play the sweepstakes game 1218. Such access to play the alternative game is restricted to a prescribed number of game rounds per access period.

The alternative game is downloaded or streamed to and displayed on the computer of mobile device screen and the game rounds are played 1218. The parameters of the alternative game are dictated by the rules and design of the sweepstakes game. Thus, the alternative game may consist of any number of game rounds, any number of winning point ranges and range spans, as well as award amounts or types of awards for each range, as defined by the sweepstake rules and thereafter designed into the game. The award for each point range can comprise of any combination and value of products, services, coupons, or amounts of money.

The sweepstakes game is played as it is played for any other embodiment except that once the one or more game rounds are played during the current visit to the online store, the person is prevented from playing further game rounds until the next time, subject to the predetermined set time period, that the person visits the online store and logs on to their user account. Thus, only a portion of the sweepstakes and alternative game is played during each visit and after electing to play. The results from the game rounds played are stored in the game information database 1212, which is updated, if applicable, from prior information. This updated information is an accumulation of all data from previously played game rounds in combination with data from the presently played rounds.

If the number of game rounds provided by the sweepstakes game is one per visit, and the number of total game rounds available for play in the sweepstakes game is 25, the person will have to visit the online store on at least 25 different occasions to complete the sweepstakes game subject to the time limitations between visits. If only one game round can be played each day, then the person must visit the online store on at least 25 different days. It may be required that the person visit the online store for 25 consecutive days, for any 25 days during a given period of time, or there may be no time restrictions in that regard (although the sweepstakes would necessarily have to expire at some point). The results of each game round will be stored after each visit as updated information in the game information database 1212 of the user's account 1210.

When the person visits the online store, logs on, and accesses the applicable web page of the store, the current status of the alternative game and thus the results of all previous game rounds are displayed. The person will be able to track the progress of the sweepstakes game upon each visit.

At the conclusion of play of each game round, 1218 it is determined if the last game round of the alternative game has been played 1220. If all game rounds have been played, a comparison is made to determine if the points accumulated in the alternative game exceed a predetermined number of points 1222. If the determination is positive, the person is provided an award 1224. If an award is achieved, it is delivered to the player by those means specified in the sweepstakes rules. If an award has not been achieved because the person's point score in the sweepstakes game was too low, the person is provided no award or a consolation prize but may be permitted to re-enter the sweepstakes a subsequent time 1226. As previously described, numerous types of awards and award values can be provided to one or more persons.

If it is determined that the last game round of the sweepstakes game has not been played 1220, the person re-enters the sweepstakes game by logging back in 1214 at a later time. If it is determined that sufficient time has elapsed 1216, the person is provided the opportunity to play the prescribed number of game rounds 1218 once again during that given visit to the online store.

In a transaction-based embodiment directed towards sports wagering, a person is given the opportunity to play one or more game rounds from a set of game rounds of an alternative game each time a wager is made on a sporting event at a designated sports book. Therefore, the person making the wager must return to the same sports book, whether at a physical or virtual location, to conduct the transaction. The person may be limited in access to the play of game rounds by such variables as: a duration of time (e.g. no more than once per hour), a period of time (e.g. each 24-hour day), a minimum wager amount (e.g. at least $10), an average wager amount (e.g. $20/day during prior week), or any other constraint that may be imposed by provider to control the ability to play game rounds. In this embodiment, the opportunity to play the alternative game is linked to the making of a wager and therefore not merely from navigation to and visiting a site; a transaction must be conducted. The distinction here is underscored by the fact that the sports book could have numerous physical or virtual locations all under common ownership without detracting from the goal of incentivizing the player to make their wagers through the same sports book. When the invention is conducted in association with visits to a physical or virtual location, the incentive is to drive traffic there in the hopes of conducting transactions and, perhaps, also presenting and displaying advertisements.

Other variables associated with the alternative game such as the award values, the number of game rounds permitted per wager, variables previously described involving other aspects of the alternative game, including the number of alternative games that can be played at any time, can be linked to the transaction or wager value, the number of wagers made and/or a total wager amount.

In this embodiment, a user account is once more necessary to identify the player. The user account can be established online through a web page interface of the sports book, by providing input at a kiosk at a physical location associated with the sports book, or by an attendant actually located at the sports book or other associated location, or through similar actions. Similar to other embodiments described herein, information identifying the person is provided in a record of a player database. Security information is established that is provided only to the person holding the account so only that the person can later access the account through input of the security data through an input device. Another method of obtaining access to the user account is through use of a player tracking card or the like containing electronic information unique to the player. These are typically provided to persons at casinos, when requested by the person, to allow the casino to track the person's gaming activity. The person is generally provided player points, which can be redeemed for goods or services, and other offerings to incentivize further play and further visits to that casino. When the card is read by an appropriate card reader, the player is identified and is then linked to the player's account.

The alternative game, data or other indicia of the game, can reside on a server that communicates with other devices through either an open network, such as the Internet, or a closed network such as a LAN or WAN that operates internally within one or more specific locations, such as a casino or the sports book within a casino. The devices, such as the personal computer or mobile device, present the alternative game to the player for play after being accessed and downloaded or streamed from the server location. The alternative game may also reside on a physical gaming machine, thus receiving player-specific game data of the alternative game from the server. Both the gaming machine and network have access to the player's account through use of a player card and/or player-specific security input. An input interface allows the player to enter the card and/or security data to access and retrieve player information. Access to the alternative game is provided. Game data is stored in memory in a record that is linked to the player's account. When retrieved, the alternative game is thus provided to the player in its current status (i.e. displaying the number of previously accumulated points and remaining and/or played number of game rounds).

The alternative game is viewed on the screen of the gaming machine or other device. Both are in networked communications providing communications between the device and system, thus enabling initiation of play or, if previous game rounds have been played, continuation of play. Awards are provided, accordingly, in conjunction with the results of the alternative game. The player can be provided the opportunity to play the alternative game multiple times and can be provided the opportunity to play a plurality of alternative games concurrently. The introduction of the alternative game in association with sport wagering provides incentive to the player to continue making wagers at the sports book of the provider offering the alternative game for play. The number of wagers made, the amount of each wager or the total wager, will have an effect on the award provided and may affect other variables of the alternative game and, if applicable, the number of alternative games that may be concurrently played.

In another embodiment, primary games, such as blackjack, poker, slots, roulette, keno, or any other game, are linked to an alternative game offered by the provider of the primary games as an incentive to play the primary game through that particular primary game provider. This is similar to the embodiment described, above, where the player plays an alternative game but can optionally choose to play each game round as a separate, distinct traditional casino-type game; be it blackjack, poker, slots, roulette, keno, or any other game. In this embodiment, however, it is the traditional game that is the primary game. The player is provided the opportunity to play an alternative game with each play of the primary game (i.e. a traditional game) doubling as a game round of the alternative game. Indicia of the alternative game, such as 704, 706 and 708 of FIG. 4, are displayed in the screen of the device providing for play of the games. As in the other embodiments, a player account is established to identify the player. When the player visits the intended physical or virtual location to play the traditional, primary game; the player inputs their personal identification number, player tracking card, or other secure data or device, to identify the player and to link the player to their account. The alternative game is linked to the account with game data from any prior game rounds stored in memory. Upon access to the player account, the alternative game electronically links to the primary game. The indicia of the alternative game are graphically placed within the display. Therefore, all players playing certain designated traditional games will be automatically linked to an alternative game subject only to the establishment or existence of a player account uniquely identifying the player. Alternatively, the alternative game is offered to the player in association with the primary game play subject to meeting certain criteria, such as the amount of player activity at the provider's location(s). The activity can be in regard to play time or wager amounts, or as a reward for participating in some promoted activity such as having dinner at a local restaurant or paying to see a show. When the alternative game is linked in, the outcome of the primary game is assessed in accordance with the paytable of the alternative game and, subject to the outcome, the counters associated with the alternative game are updated, accordingly. This assessment is distinct from the determinations made in accordance with the software instructions of the primary game, which make comparisons of the outcome against a separate and distinct paytable, which provides for completely different result in the form of a return to player based on wagers made. The alternative game can also be provided as a wagered-based game. When offered in this manner, an ante wager is required.

In any of these embodiments, the alternative game can be "bolted on" to the primary game such that the primary game would not need to be adjusted to account for the higher return to players that is achieved through the introduction of awards stemming from the alternative game. The higher payout to players would be recouped by the provider through the theoretically extended amount of play by the player of the traditional game (resulting on average in more revenues to the provider) in the effort to complete the alternative game. Although this is theoretically true, the provider may nonetheless lower the return to player percentage of the primary game to account for the added payout to the player through the alternative game. By way of example, if the RTP is 92%, and the player wagers $1.00 per play of the primary game, and it is determined that the average number of game plays a player makes on that base game is 10, the provider will retain on average 80 cents on average. If an alternative game providing a 3% RTP is added to the base game, the RTP then becomes 95% for the combined games resulting an 50 cents to the provider for every 10 games played. However, if the player must play 20 game rounds to complete the alternative game, the player would be inclined to increase the average number of games played and the provider would then receive 5% on a wager of $20 or $1.00. This is above the average of 80 cents the provider would make per player on that game if the alternative game was not bolted on to the base game.

The variables of the alternative game are adjusted based on the wager amounts made in the traditional game. For instance, the awards provided in the alternative game to a player making low wagers on the traditional game would be less than the awards provided to a player making high wagers on the traditional game. Another possible variable is associating the number of game rounds with the wager amount—a high wager having a lesser number of game rounds and thus a lesser number of traditional primary games played prior to receiving the outcome in the alternative game. A minimum wager or minimum average wager may be required in the traditional game to enable continued play of the alternative game under a given set of variables. Alternatively, maximum wager may be required to activate the game round. Further, an average wager made over the course of game rounds on the primary game can be determined and awards value provided, accordingly.

The same traditional game can be played for each game round of the alternative game or various traditional games can be played, as designated by the provider. Given the intended benefit of the present embodiment—to increase the number of plays of traditional games by a player at a given provider's establishment—the number of game rounds played in the alternative game are likely to be high in number, but not so high as to discourage the player from initiating play of the alternative game or from becoming discouraged once initiating the game due to the length of time to complete.

In another embodiment, the alternative game is described in association with the outcome of an event other than the traditional game, such as a sporting event, where a player distinctly wins or loses in regards to the event. The game of football is a prime example of a sporting event and shall be referenced hereinafter to describe this embodiment. In football, as in many other sports, the game is either won or lost. When wagering on an event such as football, the person making the wager can win "straight up"; i.e. if the team the person wagered on scored more points than the other team; based on a "spread; i.e. if the team the person wagered on scored an amount of points that is more than the other team scored plus or minus a number predetermined by a sportsbook or bookmaker that reflects how much that team is favored or disfavored as against the other team; or in association with odds also predetermined by the sportsbook or bookmaker based on how much one team is favored over the other. With regard to wagering against a spread, the person could win their wager even if the team they wagered upon lost the game. This occurs when the disfavored team beats the spread, but nonetheless does not score sufficient points to overcome the other team's score. When wagering on one team to win against another without considering a spread, odds are generally provided.

In this embodiment, an alternative game is provided by a sportsbook in conjunction with wagers made through the sportsbook on football games. It is provided in the form of a sweepstakes whereby no consideration is due in order to play the alternative game. Alternatively, it can be provided in association with an ante wager or some other consideration. As presented in the form of a sweepstakes game, the player is incentivized to make a plurality of wagers through the same sportsbook; some of which the player might not otherwise have made if not for the existence of the sweepstakes. If not presented as a sweepstakes, the alternative game is just a secondary wagering event that the player may or may not wish to partake in.

Figure 14:
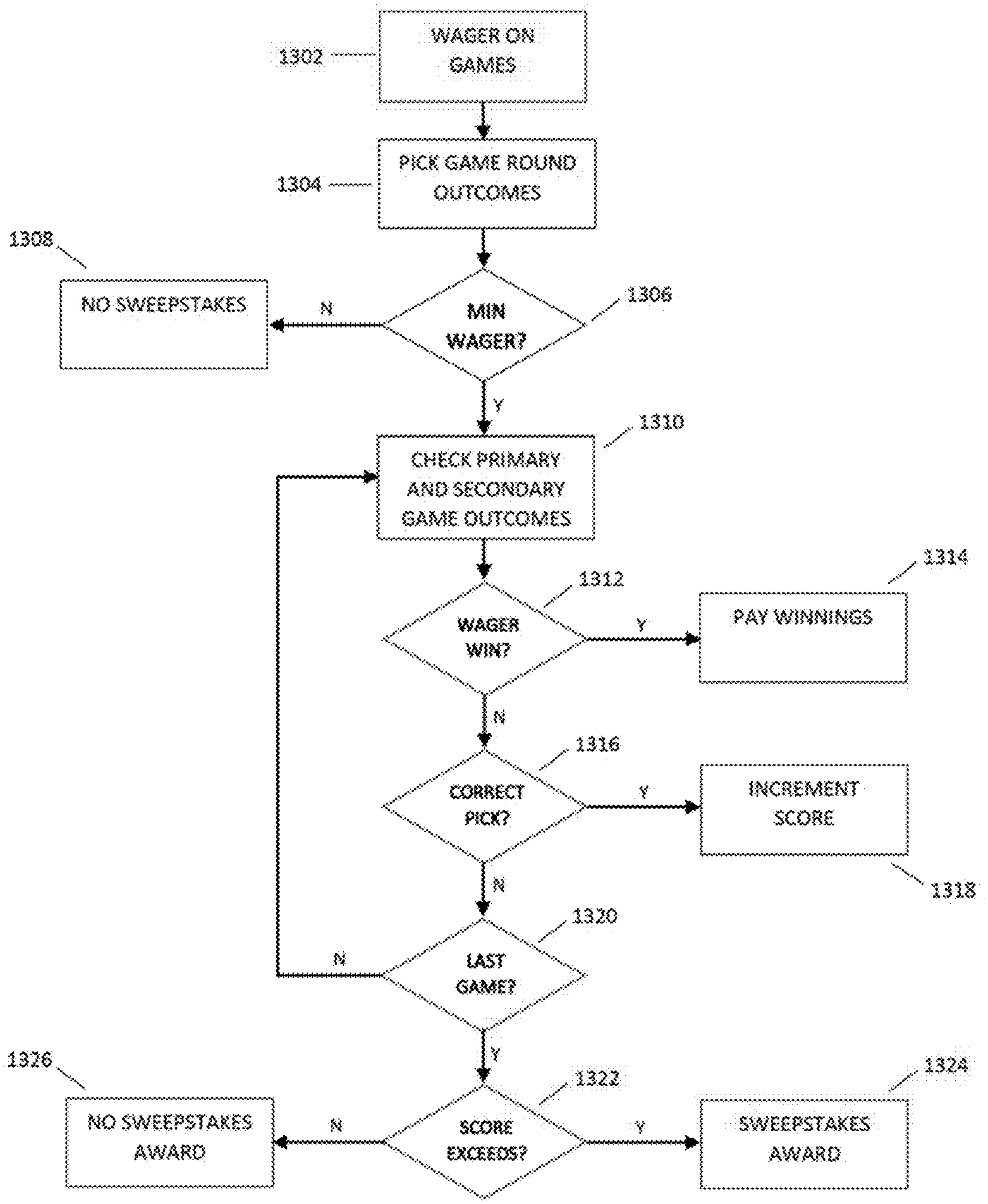
FIG. 14 is a flow diagram showing a representative method of one embodiment of the present invention in conjunction with wagers made through a sports book.

FIG. 14 presents this embodiment. Here, the player makes a wager on the outcomes of all football games played in a given week 1302, each considered a primary game event. With each wager of these primary game events, the player picks the outcomes of each game 1304 based on the spread; i.e. which team will beat the spread. This choice need not be consistent with the wager on the primary game event but nonetheless can be required if the sportsbook so chooses. If wagering for one team against the spread, for ease of processing or for any other reason, the sportsbook may desire that the pick also be for that same team. Thus, the wager and the pick are consistent for the same team and the sportsbook therefore need not require the player to proactively take the secondary action of making a pick as it will have already been made.

Each game provides an outcome, both straight up—one team wins and one team loses—and against the spread—one team beats the spread and one team does not. The wager on the football game is the primary game event, but the result can also constitute a game round or secondary game event in the alternative game. The player wagers on the primary event by selecting a team to win and receiving odds based on the selection. The player also picks the outcome based on the spread. If the alternative game is not provided as a sweepstakes, an additional wager or other consideration is included when making the wagers on the primary game events 1302. This embodiment will be described hereinafter as a sweepstakes. Although this embodiment requires a wager on all games played in any given week, in other embodiments the sweepstakes game can be provided for players that wager on a given team, some teams or all teams for each week of the regular football season, for other types of events, and various other situations. Any number of different embodiments can be designed by those skilled in the art where an event can act both as a primary event and a secondary event providing separate types of outcomes from the same event.

The wager must meet a certain minimum amount to enable play of the sweepstakes game. A determination is made 1306 to ensure the minimum wager was made. In this embodiment, this amounts to a minimum wager for each of the games. However, in an alternative embodiment, only a total wager is required and therefore different wagers can be made as between the different games. In this embodiment, it is sufficient that the combined wagers reflect a specified total amount. If the minimum wager was not made, the sweepstakes game is not offered for play 1308. In another embodiment, the potential award values reflect the minimum or average wager. For the primary game event, wagers can be made against the spread, in which case the payout would be on a 1:1 basis. Else, the wager can be odds-based so that the payout would be less than or greater than 1:1, depending on whether the team wagered on was favored or disfavored against the other team and by how much, as determined by the sportsbook or bookmaker. Regardless, the game round, secondary game event outcomes are generally determined based on the spread. This need not be the case, but if the secondary game outcomes were not based on the spread, most players would pick the team with the greater odds of winning thereby causing results that reflecting a large percentage of correct picks, consistent picks as between players, and a large swath of players potentially winning the sweepstakes. If it is the provider's intention to allow a large percentage of players to win, or to seek out the few players that pick a result that goes against the odds, then it would make sense for the provider to design the sweepstakes so that the player may select on a straight up basis.

Each game is checked for the primary game event and secondary game outcomes 1310. If the player made a successful wager based on the primary game event outcome 1312, the sportsbook pays their winnings 1314, accordingly. Whether the wager is successful or not, the game is secondarily checked for the game round or secondary game event outcome 1316. Therefore, whether or not the team picked by the player beat the spread.

The sweepstakes game provides the player an award if a pre-determined number of game round outcomes were correctly picked by the player. Different award values can be established, similar to other embodiments, based on the number of correct picks. Thus, after a check of a secondary game event 1316, a score is incremented 1318 by a count of one for each correct pick. After determination of the pick for the secondary game event 1316 and, if applicable, incrementing the score 1318, it is determined if the last of the plurality of games wagered on for the given week has been checked 1320. If it is not the last game checked and further games need to be checked for outcomes of the primary and secondary game events, the outcomes for another game are checked 1310 and the process iterates.

Once the outcomes of the last game have been checked the player receives the player's winnings 1314 from the primary game event and the score is incremented 1318 for the secondary game event, accordingly and if applicable, the score is checked to determine if the score exceeds a pre-determined number 1322. If such pre-determined number is exceeded, a pre-established sweepstakes award is provided to the player 1324. If no pre-determined numbers have been exceeded, the player loses the sweepstakes game and no award is provided 1326. Similar to other embodiments, more than one pre-determined number may exist with various awards associated with each.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A system for providing an interactive sweepstakes to a player over a period of time and through a series of interactive events, comprising:

a network of electronic devices operable to send and receive electronic communications through said network;

a distinct network site associated with said sweepstakes hosted on at least one of said electronic devices;

a game of chance associated with said sweepstakes comprising a set number of successive plays of said game of chance with each of said plays producing a random outcome from a plurality of possible outcomes, each of said plurality of outcomes comprising a primary game result and a secondary game result wherein said primary game result comprises a plurality of predetermined first awards with each of said first awards having an assigned value and associated with at least one of said plurality of outcomes, and wherein said secondary game result comprises a null value associated with a predetermined first subset of said plurality of outcomes and a unit value associated with a predetermined a second subset of said plurality of outcomes;

a first counter for counting the number of random outcomes for each play of said game of chance that matches an outcome from the second subset of said plurality of outcomes and a second counter for counting the number of plays of said game of chance;

a display screen and an input device on at least one of said electronic devices to enable the player to play said game of chance at said device, wherein;

i) said player plays said game of chance;

ii) said player receives one of said plurality of first awards;

iii) said first counter increments when the outcome is from said second subset of outcomes;

iv) said second counter increments;

v) steps (i) through (iv) are repeated until the second counter equals the set number of plays of said game of chance; and vi) said person receives a second award when said first counter exceeds a predetermined number.

2. The system of claim 1, further comprising:

a blocking program associated with said distinct network site to block access to said game of chance; and a timer associated with said blocking program, wherein said blocking program is activated in conjunction with the play of said game of chance to prevent the play of another game of chance until after a pre-determined period of time as measured by said timer has elapsed.

3. The system of claim 1, wherein the network site is a virtual online store.

4. The system of claim 1, wherein the network site is a virtual online casino.

5. The system of claim 1, further comprising:

a secure access program; and a secure identification code, wherein access to said game requires input of said secure identification code and verification by said secure access program.

6. The system of claim 1, wherein the assigned value associated with at least one of said plurality of outcomes is no value.

7. A method of conducting an interactive sweepstakes through a series of associated actions performed intermittently over a period of time and through a network system comprising: at least one device having a display and capable of receiving input from at least one input device in communication with said at least one device; at least one server in remote communication with said at least one device, at least one processor; a random number generator in communication with said processor; and at least one memory storage device for storing data and computer-coded instructions, comprising the steps of:

a) accessing a network site located on said at least one server of said network system using said input device of said at least one device in communication with said network system;

b) providing a sweepstakes to play at said network site, said sweepstakes associated with a game of chance comprising a plurality of possible outcomes derived through said random number generator, said plurality of outcomes comprising a primary game result and a secondary game result, said primary game result comprising a plurality of predetermined first awards with each of said first awards having an assigned value and associated with at least one outcome from said plurality of outcomes, and a secondary game result wherein said secondary game result comprises a null value associated with a predetermined first subset of said plurality of outcomes and a unit value associated with a predetermined second subset of said plurality of outcomes;

c) playing said game of chance using said at least one input device during each of a plurality of visits to said network site, the playing of said game of chance during each of said plurality of visits further comprising:

(i) playing said game of chance;

(ii) providing the first award associated with the outcome;

(iii) determining if the outcome from said game of chance is included in said second subset of outcomes;

iv) incrementing a first counter if the outcome from said plurality of outcomes is within said second subset of outcomes;

v) incrementing a second counter each time said game of chance is played;

(vi) determining if said second counter has met a second predetermined incrementation level; and (vii) determining if said first counter has met a first predetermined incrementation level and awarding said player a second award if said cumulative score exceeds said first predetermined incrementation level.

8. The method of claim 7, further comprising the steps of:

establishing a player account through input of information uniquely identifying said player;

establishing a secure access code to provide secure access to said player account;

linking said game of chance with said player account, wherein access to said player account is required prior playing said game of chance; and accessing said player account through the input of said secure access code to play said game of chance.

9. The method of claim 8, further comprising the step of:

establishing periodic play of said game of chance through said player account by establishing a time frame wherein only a specified number of plays of said game of chance can be played within said time frame.

10. The method of claim 7, wherein the assigned value associated with at least one outcome from said plurality of outcomes is no value.

11. A method of playing a secondary game in association with a primary game on an electronic gaming system, comprising the steps of:

making a first wager on a primary game;

playing said primary game;

to obtain an outcome from a plurality of outcomes;

providing one of a plurality of first predetermined awards to said player with each said award having an assigned value and associated with at least one of said plurality of outcomes;

incrementing a counter each time said outcome of said primary game is a unit value;

generating a count comprising the sum of each of said increments of said counter;

comparing said count to a pre-defined number at least after the primary game has been played a set number of times; and awarding said player a second award in said secondary game if said count exceeds said pre-defined number.

12. The method of claim 11, wherein all of said primary games are played within a specified period of time.

13. The method of claim 12, wherein a plurality of players play said secondary game and at least one of said plurality of players is awarded said secondary award if the count of said player exceeds the count of other of said players playing said secondary game.

14. The method of claim 11, wherein the assigned value associated with at least one of said plurality of outcomes is no value.

* * * * *